US011349595B2

(12) United States Patent
Zhang et al.

(10) Patent No.: US 11,349,595 B2
(45) Date of Patent: May 31, 2022

(54) SERVICE MULTIPLEXING METHOD, SERVICE DEMULTIPLEXING METHOD, AND RELATED DEVICE

(71) Applicant: HUAWEI TECHNOLOGIES CO., LTD., Guangdong (CN)

(72) Inventors: Xiaojun Zhang, Shenzhen (CN); Min Zha, Shenzhen (CN); Qiwen Zhong, Shenzhen (CN); Jing Huang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 196 days.

(21) Appl. No.: 16/785,139

(22) Filed: Feb. 7, 2020

(65) Prior Publication Data
US 2020/0177305 A1 Jun. 4, 2020

Related U.S. Application Data

(63) Continuation of application No. PCT/CN2018/092835, filed on Jun. 26, 2018.

(30) Foreign Application Priority Data

Aug. 8, 2017 (CN) .......................... 201710671402.8

(51) Int. Cl.
*H04L 1/00* (2006.01)
*H04L 47/283* (2022.01)

(52) U.S. Cl.
CPC .......... *H04L 1/0025* (2013.01); *H04L 1/0005* (2013.01); *H04L 1/0018* (2013.01);
(Continued)

(58) Field of Classification Search
CPC ... H04L 1/0025; H04L 1/0005; H04L 1/0018; H04L 1/0041; H04L 1/0057;
(Continued)

(56) References Cited

U.S. PATENT DOCUMENTS 7,123,625 B2 10/2006 Dufour et al.
2003/0123472 A1 7/2003 Dufour et al.
(Continued)

FOREIGN PATENT DOCUMENTS

CN 103237339 A 8/2013
CN 103875205 A 6/2014
(Continued)

OTHER PUBLICATIONS

OIF: "Flex Ethernet Implementation Agreement", OIF , Optical Internetworking Forum, Jun. 21, 2017 (Jun. 21, 2017), pp. 1-35, XP055459219.
(Continued)

*Primary Examiner* — Walter J Divito
(74) *Attorney, Agent, or Firm* — Womble Bond Dickinson (US) LLP

(57) ABSTRACT

Embodiments of the present invention disclose a service multiplexing method. The method includes: sending, by a sending device, a bit block stream of a first service to a receiving device; if the sending device determines to switch from the first service to a second service for service sending, sending, by the sending device, at least one service switching indication bit block to the receiving device; and sending, by the sending device, a bit block stream of the second service to the receiving device. In addition, a service switching indication bit block is inserted between bit block streams that require service switching, to perform service switching, thereby reducing a latency and jitter in a service switching process, and ensuring a low latency during service switching.

20 Claims, 19 Drawing Sheets

(52) U.S. Cl.
CPC .......... *H04L 1/0041* (2013.01); *H04L 1/0057* (2013.01); *H04L 1/0071* (2013.01); *H04L 47/283* (2013.01)

(58) Field of Classification Search
CPC . H04L 1/0071; H04L 47/283; H04L 41/0668; H04L 47/72; H04L 47/722; H04L 47/728; H04L 47/821; H04J 2203/0085; H04J 3/1658
See application file for complete search history.

(56) References Cited

U.S. PATENT DOCUMENTS

| | | | |
|---|---|---|---|
| 2008/0080860 | A1 | 4/2008 | Katagiri |
| 2010/0092174 | A1 | 4/2010 | Brown et al. |
| 2013/0336236 | A1* | 12/2013 | Brus .................. H04L 47/30 370/329 |
| 2016/0197743 | A1 | 7/2016 | Su et al. |
| 2017/0005742 | A1 | 1/2017 | Gareau et al. |
| 2018/0159785 | A1 | 6/2018 | Wu et al. |
| 2018/0183538 | A1 | 6/2018 | Chen et al. |
| 2020/0076731 | A1 | 3/2020 | Zhong |

FOREIGN PATENT DOCUMENTS

| | | | |
|---|---|---|---|
| CN | 105516288 | A | 4/2016 |
| CN | 105790883 | A | 7/2016 |
| CN | 105871502 | A | 8/2016 |
| CN | 106411454 | A | 2/2017 |
| CN | 106788855 | A | 5/2017 |
| EP | 3113502 | A1 | 1/2017 |
| JP | S62227231 | A | 10/1987 |
| JP | 2005260397 | A | 9/2005 |
| JP | 2008092130 | A | 4/2008 |

OTHER PUBLICATIONS

Seiki Kuwabara et al., A Study of Reliability Enhancement of Logical MAC Links for Large Capacity Bandwidth-variable Interface. IEICE Tech. Rep., vol. 116, No. 402, OCS2016-69, pp. 27-30, Jan. 2017.

IEEE Std 802.3-2015, IEEE Standard for Ethernet, IEEE Computer Society, Sponsored by the LAN/MAN Standards Committee, Approved Sep. 3, 2015, 4017 pages.

IEEE Std 802.1Qbv™-2015, IEEE Standard for Local and metropolitan area networks-Bridges and Bridged Networks Amendment 25: Enhancements for Scheduled Traffic, 2005. total 57 pages.

IEEE Std 802.1Qbu™-2016(Amendmentto IEEE Std 802.1Q™-2014), IEEE Standard for Local and metropolitan area networks—Bridges and Bridged Networks—Amendment 26: Frame Preemption, 2016. total 52 pages.

Flex Ethernet, Implementation Agreement, IA # OIF-FLEXE-01.0, Mar. 2016. 31 pages.

* cited by examiner

FIG. 22

SERVICE MULTIPLEXING METHOD, SERVICE DEMULTIPLEXING METHOD, AND RELATED DEVICE

CROSS-REFERENCE TO RELATED APPLICATIONS

This application is a continuation of International Application No. PCT/CN2018/092835, filed on Jun. 26, 2018, which claims priority to Chinese Patent Application No. 201710671402.8, filed on Aug. 8, 2017. The disclosures of the aforementioned applications are hereby incorporated by reference in their entireties.

TECHNICAL FIELD

The present invention relates to the field of communications technologies, and in particular, to a service multiplexing method, a service demultiplexing method, and a related device.

BACKGROUND

As a service interface, 802.3-based Ethernet defined by the Institute of Electrical and Electronics Engineers (IEEE) is successfully applied to various scenarios. However, with the development of network technologies, a network needs to support more service types.

In the prior art, a concept of flexible Ethernet (FlexE) is proposed, so that a network can support a plurality of types of services. By using the flexE, a plurality of services can be multiplexed on a same physical link. As shown in FIG. 1, a network device includes a plurality of encoders 101 and a multiplexing module 102. In the flexE, a plurality of services are encoded by the encoders 101 corresponding to the services, the encoders 101 send encoded code block streams to the multiplexing module 102, and the multiplexing module 102 can multiplex the code block streams of the plurality of services. A multiplexing method used by the multiplexing module 102 is a time division multiplexing (TDM) technology. The multiplexing module 102 performs timeslot division by using a code block as a granularity, and implements multiplexing through timeslot interleaving. An example of a specific structure of a service data stream output by the multiplexing module 102 may be shown in FIG. 2. 20 timeslots are used as a cycle, and one flexE overhead code block is inserted every 1023 cycles for timeslot positioning. In a specific service transmission process, each timeslot may be used as an independent channel to transmit a service, and 20 timeslots are 20 channels and may be used to transmit 20 services.

In flexE-based multiplexing, a service carried in each timeslot is preconfigured, and real-time service switching cannot be performed for the service data stream output by the multiplexing module 102.

SUMMARY

This application provides a service multiplexing method, a service demultiplexing method, and a related device, so that real-time service switching can be implemented, and a low latency during service switching can be effectively ensured.

A first aspect of embodiments of the present invention provides a service multiplexing method that includes the following operations.

Operation A. A sending device inputs a bit block stream of a first service and a bit block stream of a second service to corresponding buffers.

Receiving interfaces of the sending device are configured to receive the bit block stream of the first service and the bit block stream of the second service, and the sending device may determine a first buffer corresponding to the bit block stream of the first service and a second buffer corresponding to the bit block stream of the second service.

The sending device may input the bit block stream of the first service to the corresponding first buffer, and input the bit block stream of the second service to the corresponding second buffer.

In this aspect, the bit block stream of the first service and the bit block stream of the second service may be any two bit block streams, needing to be sequentially sent to the receiving device, in bit block streams that are of a plurality of services and that are received by the sending device.

Operation B. The sending device sends the bit block stream of the first service to a receiving device.

The sending device may determine priorities of sending the bit block stream of the first service and the bit block stream of the second service to the receiving device.

This aspect is described by using an example in which the bit block stream of the first service is sent to the receiving device before the bit block stream of the second service.

For example, the sending device determines that sending waiting time of the bit block stream of the first service is longer than sending waiting time of the bit block stream of the second service, and then determines that the bit block stream of the first service is sent to the receiving device before the bit block stream of the second service.

When the sending device determines that the bit block stream of the first service is sent to the receiving device before the bit block stream of the second service, the sending device may send the bit block stream of the first service to the receiving device.

Operation C. The sending device determines whether to switch from the first service to the second service for service sending, and performs operation D if the sending device determines to switch from the first service to the second service.

In this aspect, the sending device may determine to switch to the bit block stream of the second service for sending after the entire bit block stream of the first service is sent.

For another example, the sending device may determine to switch to the bit block stream of the second service for service sending after preset data traffic predetermined by the sending device in the bit block stream of the first service is sent. To be specific, the sending device may switch to the bit block stream of the second service for service sending before the sending device sends the entire bit block stream of the first service and after the sending device sends the preset data traffic in the bit block stream of the first service.

Operation D. The sending device sends at least one service switching indication bit block to the receiving device.

If the sending device determines to switch from the first service to the second service for service sending, the sending device may insert the at least one service switching indication bit block between the bit block stream of the first service and the bit block stream of the second service, and send the at least one service switching indication bit block to the receiving device.

The at least one service switching indication bit block is used to indicate that the first service is switched to the second service for service sending.

Operation E. The sending device sends the bit block stream of the second service to the receiving device.

The sending device may send the bit block stream of the second service after sending the at least one service switching indication bit block.

It can be learned that the sending device chronologically sends the bit block stream of the first service, the at least one service switching indication bit block, and the bit block stream of the second service based on sending time.

A beneficial effect of the service multiplexing method provided in this aspect lies in that the sending device can implement real-time service switching on any bit block based on needs. In addition, a service switching indication bit block is inserted between bit block streams that require service switching, to perform service switching, thereby reducing a latency and jitter in a service switching process, and ensuring a low latency during service switching.

In this embodiment, the sending device may perform switching to send a service with a high priority before a service with a low priority, so that preemption sending of the service with a high priority is implemented, and a very low latency and very low jitter of the service with a high priority are ensured.

In this embodiment, service multiplexing is implemented by using the buffers, thereby effectively avoiding a bandwidth waste and a transmission latency caused because multiplexing is performed by using exclusive bandwidth.

In an embodiment, any bit block included in the bit block stream of the first service, any bit block included in the bit block stream of the second service, and any one of the at least one service switching indication bit block are M1/M2 bit blocks, where M1 represents a quantity of payload bits in each bit block, M2 represents a total quantity of bits in each bit block, M1 and M2 are positive integers, and M2>M1.

In one embodiment, before performing operation B, the sending device further performs the following operations.

Operation B01. The sending device obtains first service data of the first service.

The first service in this aspect may be a non-Ethernet service.

Operation B02. The sending device encodes the first service data to generate the bit block stream of the first service.

Before performing operation E, the sending device further performs the following operations.

Operation E01. The sending device obtains second service data of the second service.

Operation E02. The sending device encodes the second service data to generate the bit block stream of the second service.

In this aspect, the sending device multiplexes data of networks of different types, so that the sending device can multiplex services of different types, and the service multiplexing method in this embodiment can be applied to different network environments.

In one embodiment, if the M1/M2 bit block may be a 64 B/66 B bit block, M2-M1, namely, 66-64, represents a bit quantity of a header synchronization header in each bit block.

In this aspect, one or more service switching indication bit blocks may be used to indicate that the bit block stream of the first service is switched to the bit block stream of the second service.

The service switching indication bit block may include parameters O0, D1, D2, D3, C4, C5, C6, and C7, where the parameters D1, D2, and D3 are 8-bit data, the parameters C4, C5, C6, and C7 are 7-bit data, and the parameter O0 is a 4-bit control code.

In one embodiment, if the M1/M2 bit block is an 8 B/10 B bit block, there are a plurality of service switching indication bit blocks, and the plurality of service switching indication bit blocks include at least one special bit block and at least one data bit block.

It can be learned that for 8 B/10B encoding, the special bit block and the data bit block need to be used together to indicate service switching.

It can be learned that in an encoding manner in this aspect, the service switching indication bit block is used to indicate service switching, so that real-time service switching can be implemented by using the at least one service switching indication bit block, thereby reducing a latency and jitter in a service switching process, and ensuring a low latency during service switching.

In one embodiment, the at least one service switching indication bit block further includes indication information, and the indication information is used to indicate a quantity of bit blocks included in the bit block stream that is of the second service and that is sent to the receiving device.

Specifically, if the service switching indication bit block is a 64 B/66 B bit block, the indication information may be transmitted by using any one of the parameters D1, D2, D3, C4, C5, C6, and C7 included in the service switching indication bit block stream, or the indication information may be transmitted by using a plurality of service switching indication bit blocks.

In this aspect, in a service multiplexing process of the sending device, the quantity of bit blocks included in the bit block stream of the second service may be notified in real time by using the at least one service switching indication bit block, so that the quantity of bit blocks included in the bit block stream of the second service can be notified to the receiving device while a low latency is ensured.

In one embodiment, before performing operation D, the sending device further performs the following operations.

Operation D01. The sending device determines a target identifier.

The target identifier is an identifier corresponding to the second service.

A specific process in which the sending device obtains the target identifier may be as follows:

The sending device may receive, in advance, an identifier corresponding to any one of the plurality of services, and the sending device may determine the target identifier corresponding to the second service.

After receiving the plurality of services, the sending device may configure a corresponding identifier for any one of the plurality of services, and the sending device may determine the target identifier corresponding to the second service from the configured identifier.

Operation D02. The sending device generates the at least one service switching indication bit block.

The at least one service switching indication bit block includes the target identifier, the target identifier is used to instruct the receiving device to save the bit block stream of the second service to a target buffer, and the target buffer is a buffer allocated by the receiving device to the target identifier.

In this aspect, when the sending device sends the at least one service switching indication bit block including the target identifier to the receiving device, the receiving device may determine, based on the at least one service switching indication bit block, that a service is switched, and may determine, based on the target identifier, that the service is switched to the bit block stream of the second service, thereby improving service processing efficiency of the receiving device.

In one embodiment, the method further includes:

if the sending device determines that there is an idle bit block in the bit block stream of the first service and/or the bit block stream of the second service, deleting, by the sending device, the idle bit block.

Before the receiving interfaces of the sending device input bit block streams of a plurality of services to corresponding buffers tx_buf, the sending device may determine whether there is an idle bit block in the bit block streams of the plurality of services. In this embodiment, the idle bit block is a dedicated control bit block used for rate matching in an Ethernet standard, and the idle bit block may be sent when there is no valid data transmission currently. It can be learned that when the sending device deletes the idle bit block, utilization of bandwidth on which the sending device sends a service can be improved.

A second aspect of the embodiments of the present invention provides a service demultiplexing method that includes the following operations.

Operation F. A receiving device receives a bit block stream sent by a sending device.

Operation G. The receiving device determines, in the bit block stream, whether at least one service switching indication bit block sent by the sending device is received, and performs operation H if the receiving device determines that the at least one service switching indication bit block is received.

The at least one service switching indication bit block is used to indicate that the sending device switches from a first service to a second service for service sending, and a bit block stream of the first service is a bit block stream that is received by the receiving device before the receiving device receives the at least one service switching indication bit block.

Operation H. The receiving device determines that a bit block stream that is received after the at least one service switching indication bit block is received is a bit block stream of the second service.

If the receiving device determines that the at least one service switching indication bit block is received, the receiving device may determine that the bit block stream that is received by the receiving device after the receiving device receives the at least one service switching indication bit block is the bit block stream of the second service.

It can be learned that in this aspect, the receiving device may determine, based on the at least one service switching indication bit block, that service switching is performed, and the receiving device may determine that the receiving device chronologically sends the bit block stream of the first service, the at least one service switching indication bit block, and the bit block stream of the second service based on receiving time.

A beneficial effect of the service demultiplexing method provided in this aspect lies in that the receiving device can determine service switching on any bit block, thereby reducing a latency and jitter in a service switching process, and ensuring a low latency during service switching. In this embodiment, service demultiplexing is implemented by using buffers, thereby effectively avoiding a bandwidth waste and a transmission latency caused because demultiplexing is performed by using exclusive bandwidth.

In one embodiment, any bit block included in the bit block stream of the first service, any bit block included in the bit block stream of the second service, and any one of the at least one service switching indication bit block are M1/M2 bit blocks, where M1 represents a quantity of payload bits in each bit block, M2 represents a total quantity of bits in each bit block, M1 and M2 are positive integers, and M2>M1.

In one embodiment, before performing operation H, the receiving device further performs the following operations.

Operation H01. The receiving device receives a bit block stream that is of the first service and that is sent by the sending device.

Operation H02. The receiving device decodes the bit block stream of the first service, to obtain first service data of the first service.

After performing operation H, the receiving device further performs the following operations.

Operation H11. The receiving device receives the bit block stream that is of the second service and that is sent by the sending device.

Operation H12. The receiving device decodes the bit block stream of the second service, to obtain first service data of the second service.

In this aspect, the receiving device can demultiplex services of different types, so that the service demultiplexing method in this embodiment can be applied to different network environments.

In one embodiment, if the M1/M2 bit block may be a 64 B/66 B bit block, M2-M1, namely, 66-64, represents a bit quantity of a header synchronization header in each bit block.

In this aspect, one or more service switching indication bit blocks may be used to indicate that the bit block stream of the first service is switched to the bit block stream of the second service.

The service switching indication bit block may include parameters O0, D1, D2, D3, C4, C5, C6, and C7, where the parameters D1, D2, and D3 are 8-bit data, the parameters C4, C5, C6, and C7 are 7-bit data, and the parameter O0 is a 4-bit control code.

In one embodiment, if the M1/M2 bit block is an 8 B/10 B bit block, there are a plurality of service switching indication bit blocks, and the plurality of service switching indication bit blocks include at least one special bit block and at least one data bit block.

It can be learned that for 8 B/10B encoding, the special bit block and the data bit block need to be used together to indicate service switching.

In one embodiment, after performing operation H, the receiving device further needs to perform the following operations.

Operation H21. The receiving device obtains indication information included in the at least one service switching indication bit block.

The indication information is used to indicate a quantity of bit blocks included in the bit block stream of the second service.

Specifically, if the service switching indication bit block is a 64 B/66 B bit block, the indication information may be transmitted by using any one of the parameters D1, D2, D3, C4, C5, C6, and C7 included in the service switching indication bit block stream, or the indication information may be transmitted by using a plurality of service switching indication bit blocks.

Operation H22. The receiving device determines, according to the indication information, a quantity of bit blocks included in the bit block stream of the second service.

In this aspect, in a service demultiplexing process, the receiving device may determine, by using the at least one service switching indication bit block, the quantity of bit blocks included in the bit block stream of the second service, thereby ensuring a low latency in the service demultiplexing process.

In one embodiment, after performing operation H, the receiving device further needs to perform the following operations.

Operation H31. The receiving device obtains a target identifier included in the at least one service switching indication bit block.

The target identifier is an identifier corresponding to the second service.

Operation H32. The receiving device saves the bit block stream of the second service to a target buffer.

The target buffer is a buffer allocated by the receiving device to the target identifier.

In this aspect, when the receiving device receives the at least one service switching indication bit block including the target identifier, the receiving device may determine, based on the at least one service switching indication bit block, that a service is switched, and may determine, based on the target identifier, that the service is switched to the bit block stream of the second service, thereby improving service processing efficiency of the receiving device.

In one embodiment, the method further includes:

if the receiving device determines that there is an idle bit block in the bit block stream of the first service and/or the bit block stream of the second service, deleting, by the receiving device, the idle bit block.

Before the receiving device buffers bit block streams of a plurality of services to corresponding buffers tx_buf, the receiving device may determine whether there is an idle bit block in the bit block streams of the plurality of services. In this embodiment, the idle bit block is a dedicated control bit block used for rate matching in an Ethernet standard, and the idle bit block may be sent when there is no valid data transmission currently. It can be learned that when the receiving device deletes the idle bit block, service processing efficiency of the receiving device can be improved.

A third aspect of the embodiments of the present invention provides a sending device, including a transmitter and a multiplexer connected to the transmitter.

The transmitter is configured to send a bit block stream of a first service to a receiving device.

The multiplexer is configured to determine whether to switch from the first service to a second service for service sending.

The transmitter is further configured to: if the multiplexer determines to switch from the first service to the second service for service sending, send at least one service switching indication bit block to the receiving device, where the at least one service switching indication bit block is used to indicate that the first service is switched to the second service for service sending; and the transmitter is further configured to send a bit block stream of the second service to the receiving device.

The sending device in this aspect is configured to perform the service multiplexing method in the first aspect of this application. For a specific process of performing the service multiplexing method, refer to the first aspect of this application. Details are not described again.

A beneficial effect of the sending device provided in this aspect lies in that the sending device can implement real-time service switching on any bit block based on needs. In addition, a service switching indication bit block is inserted between bit block streams that require service switching, to perform service switching, thereby reducing a latency and jitter in a service switching process, and ensuring a low latency during service switching.

In this embodiment, the sending device may perform switching to send a service with a high priority before a service with a low priority, so that preemption sending of the service with a high priority is implemented, and a very low latency and very low jitter of the service with a high priority are ensured. In this embodiment, service multiplexing is implemented by using buffers, thereby effectively avoiding a bandwidth waste and a transmission latency caused because multiplexing is performed by using exclusive bandwidth.

In one embodiment, any bit block included in the bit block stream of the first service, any bit block included in the bit block stream of the second service, and any one of the at least one service switching indication bit block are M1/M2 bit blocks, where M1 represents a quantity of payload bits in each bit block, M2 represents a total quantity of bits in each bit block, M1 and M2 are positive integers, and M2>M1.

In one embodiment, the transmitter is further configured to: obtain first service data of the first service, encode the first service data to generate the bit block stream of the first service, obtain second service data of the second service, and encode the second service data to generate the bit block stream of the second service.

In this aspect, the sending device multiplexes data of networks of different types, so that the sending device can multiplex services of different types, and the sending device in this embodiment can be applied to different network environments.

In one embodiment, if the M1/M2 bit block is a 64 B/66 B bit block, M2-M1, namely, 66-64, represents a bit quantity of a header synchronization header in each bit block.

In this aspect, one or more service switching indication bit blocks may be used to indicate that the bit block stream of the first service is switched to the bit block stream of the second service.

The service switching indication bit block may include parameters O0, D1, D2, D3, C4, C5, C6, and C7, where the parameters D1, D2, and D3 are 8-bit data, the parameters C4, C5, C6, and C7 are 7-bit data, and the parameter O0 is a 4-bit control code.

In one embodiment, if the M1/M2 bit block is an 8 B/10 B bit block, there are a plurality of service switching indication bit blocks, and the plurality of service switching indication bit blocks include at least one special bit block and at least one data bit block.

It can be learned that for 8 B/10B encoding, the special bit block and the data bit block need to be used together to indicate service switching.

It can be learned that according to the receiving device in this aspect, the service switching indication bit block is used to indicate service switching, so that real-time service switching can be implemented by using the at least one service switching indication bit block, thereby reducing a latency and jitter in a service switching process, and ensuring a low latency during service switching.

In one embodiment, the at least one service switching indication bit block further includes indication information, and the indication information is used to indicate a quantity of bit blocks included in the bit block stream that is of the second service and that is sent to the receiving device.

Specifically, if the service switching indication bit block is a 64 B/66 B bit block, the indication information may be transmitted by using any one of the parameters D1, D2, D3, C4, C5, C6, and C7 included in the service switching indication bit block stream, or the indication information may be transmitted by using a plurality of service switching indication bit blocks.

In this aspect, in a service multiplexing process of the sending device, the quantity of bit blocks included in the bit block stream of the second service may be notified in real time by using the at least one service switching indication bit block, so that the quantity of bit blocks included in the bit block stream of the second service can be notified to the receiving device while a low latency is ensured.

In one embodiment, the multiplexer is further configured to: determine a target identifier, where the target identifier is an identifier corresponding to the second service; and generate the at least one service switching indication bit block, where the at least one service switching indication bit block includes the target identifier, the target identifier is used to instruct the receiving device to save the bit block stream of the second service to a target buffer, and the target buffer is a buffer allocated by the receiving device to the target identifier.

In this aspect, when the sending device sends the at least one service switching indication bit block including the target identifier to the receiving device, the receiving device may determine, based on the at least one service switching indication bit block, that a service is switched, and may determine, based on the target identifier, that the service is switched to the bit block stream of the second service, thereby improving service processing efficiency of the receiving device.

In one embodiment, the multiplexer is further configured to: if it is determined that there is an idle bit block in the bit block stream of the first service and/or the bit block stream of the second service, delete the idle bit block.

Before the sending device inputs bit block streams of a plurality of services to corresponding buffers tx_buf, the sending device may determine whether there is an idle bit block in the bit block streams of the plurality of services. In this embodiment, the idle bit block is a dedicated control bit block used for rate matching in an Ethernet standard, and the idle bit block may be sent when there is no valid data transmission currently. It can be learned that when the sending device deletes the idle bit block, utilization of bandwidth on which the sending device sends a service can be improved.

A fourth aspect of the embodiments of the present invention provides a receiving device, including:

a receiver, configured to determine whether at least one service switching indication bit block sent by a sending device is received, where the at least one service switching indication bit block is used to indicate that the sending device switches from a first service to a second service for service sending, and a bit block stream of the first service is a bit block stream that is received before the at least one service switching indication bit block is received; and a demultiplexer, configured to: if it is determined that the at least one service switching indication bit block is received, determine that a bit block stream that is received after the at least one service switching indication bit block is received is a bit block stream of the second service.

The receiver is connected to the demultiplexer.

This aspect is used to perform the service demultiplexing method in the second aspect of this application. For a specific process of performing the service demultiplexing method, refer to the second aspect of this application. Details are not described again.

In one embodiment, any bit block included in the bit block stream of the first service, any bit block included in the bit block stream of the second service, and any one of the at least one service switching indication bit block are M1/M2 bit blocks, where M1 represents a quantity of payload bits in each bit block, M2 represents a total quantity of bits in each bit block, M1 and M2 are positive integers, and M2>M1.

In one embodiment, the receiver is further configured to receive the bit block stream that is of the first service and that is sent by the sending device; the demultiplexer is further configured to decode the bit block stream of the first service to obtain first service data of the first service; the receiver is further configured to receive the bit block stream that is of the second service and that is sent by the sending device; and the demultiplexer is further configured to decode the bit block stream of the second service to obtain first service data of the second service.

In this aspect, the receiving device can demultiplex services of different types, so that the service demultiplexing method in this embodiment can be applied to different network environments.

In one embodiment, if the M1/M2 bit block is a 64 B/66 B bit block, M2-M1, namely, 66-64, represents a bit quantity of a header synchronization header in each bit block.

In this aspect, one or more service switching indication bit blocks may be used to indicate that the bit block stream of the first service is switched to the bit block stream of the second service.

The service switching indication bit block may include parameters O0, D1, D2, D3, C4, C5, C6, and C7, where the parameters D1, D2, and D3 are 8-bit data, the parameters C4, C5, C6, and C7 are 7-bit data, and the parameter O0 is a 4-bit control code.

In one embodiment, if the M1/M2 bit block is an 8 B/10 B bit block, there are a plurality of service switching indication bit blocks, and the plurality of service switching indication bit blocks include at least one special bit block and at least one data bit block.

It can be learned that for 8 B/10B encoding, the special bit block and the data bit block need to be used together to indicate service switching.

In one embodiment, the demultiplexer is further configured to: obtain indication information included in the at least one service switching indication bit block, where the indication information is used to indicate a quantity of bit blocks included in the bit block stream of the second service; and determine, according to the indication information, the quantity of bit blocks included in the bit block stream of the second service.

In this aspect, in a service demultiplexing process, the receiving device may determine, by using the at least one service switching indication bit block, the quantity of bit blocks included in the bit block stream of the second service, thereby ensuring a low latency in the service demultiplexing process.

In one embodiment, the demultiplexer is further configured to: obtain a target identifier included in the at least one service switching indication bit block, where the target identifier is an identifier corresponding to the second service; and save the bit block stream of the second service to a target buffer, where the target buffer is a buffer allocated by the receiving device to the target identifier.

In this aspect, when the receiving device receives the at least one service switching indication bit block including the target identifier, the receiving device may determine, based on the at least one service switching indication bit block, that a service is switched, and may determine, based on the target identifier, that the service is switched to the bit block stream of the second service, thereby improving service processing efficiency of the receiving device.

In one embodiment, the demultiplexer is further configured to: if it is determined that there is an idle bit block in the bit block stream of the first service and/or the bit block stream of the second service, delete the idle bit block.

Before the receiving device buffers bit block streams of a plurality of services to corresponding buffers tx_buf, the receiving device may determine whether there is an idle bit block in the bit block streams of the plurality of services. In this embodiment, the idle bit block is a dedicated control bit block used for rate matching in an Ethernet standard, and the idle bit block may be sent when there is no valid data transmission currently. It can be learned that when the receiving device deletes the idle bit block, service processing efficiency of the receiving device can be improved.

Beneficial effects of the service multiplexing method, the service demultiplexing method, and the related device that are provided in this application lie in that when the sending device determines to switch from the first service to the second service for service sending, the sending device may insert the at least one service switching indication bit block between the bit block stream of the first service and the bit block stream of the second service, so that the sending device can sequentially send the bit block stream of the first service, the at least one service switching indication bit block, and the bit block stream of the second service to the receiving device. It can be learned that the sending device can implement real-time service switching by using the at least one service switching indication bit block, thereby reducing a latency and jitter in the service switching process, and ensuring a low latency during service switching.

BRIEF DESCRIPTION OF DRAWINGS

FIG. 22 is a schematic structural diagram of a codeword in an embodiment of a service switching indication bit block stream in this application;

DESCRIPTION OF EMBODIMENTS

Figure 1:
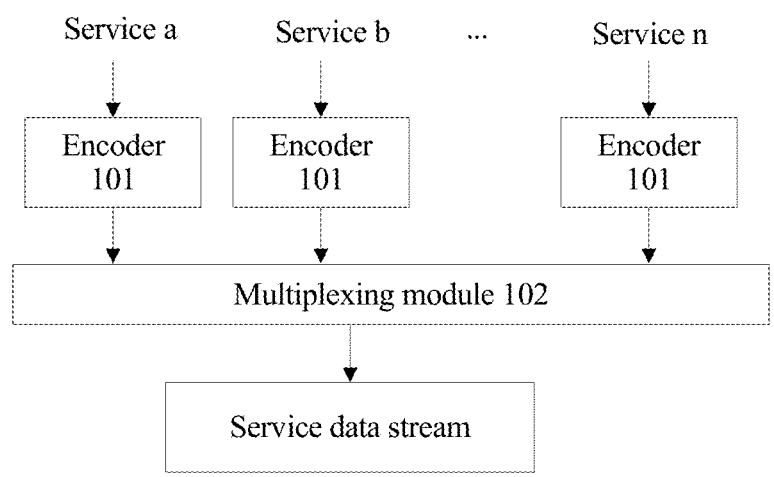
FIG. 1 is a schematic structural diagram of a network device in the prior art.
Figure 2:
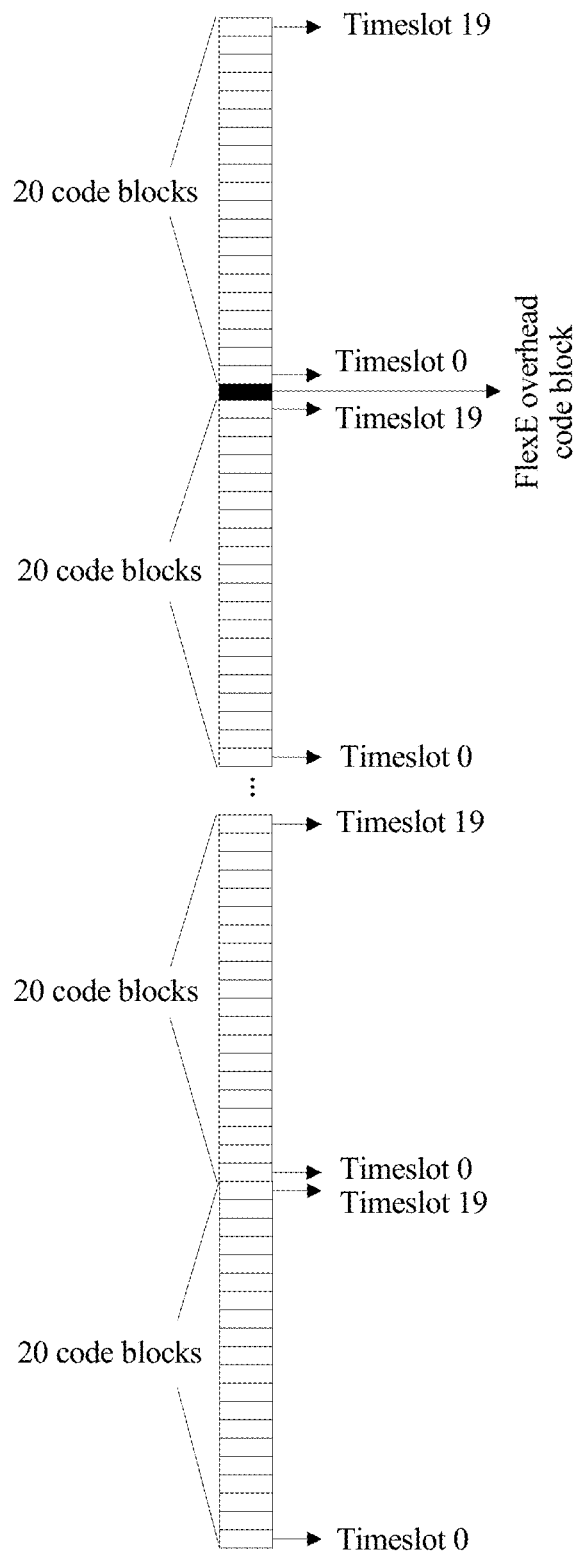
FIG. 2 is a schematic structural diagram of a service data stream output by a network device in the prior art.
Figure 3:
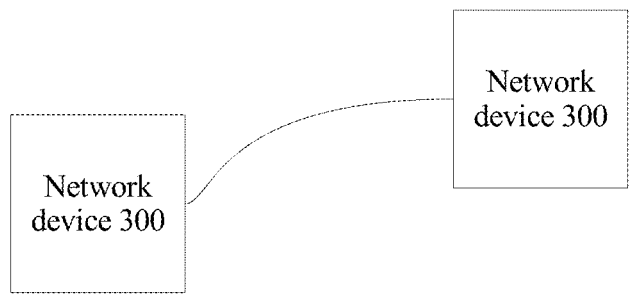
FIG. 3 is a schematic structural diagram of an embodiment of a communications network in this application.

This application provides a communications network. The communications network can implement a service multiplexing method and a service demultiplexing method in this application. A structure of the communications network provided in this application is described below by way of example with reference to FIG. 3.

The communications network includes at least two connected network devices 300. A specific quantity of network devices 300 included in the communications network is not limited in this embodiment, and a specific quantity of network devices 300 connected to any network device 300 is not limited in this embodiment.

The network device in this embodiment may be a device such as a network adapter, a switch, or a router.

The network device may be applied to a network environment such as the Ethernet, a radio access network (RAN), or a wireless local area network (WLAN).

A hardware structure of the network device is described below with reference to an embodiment shown in FIG. 4.

This embodiment is described by using an example in which the network device is used as a sending device. The network device used as the sending device is configured to: multiplex received service data and send a multiplexed bit block stream to a receiving device.

This embodiment is described by using an example in which the network device 400 is configured to receive service data sent by a first network device 401, a second network device 402, a third network device 403, and an $N^{th}$ network device 404.

An amount of service data that the network device 400 can receive is not limited in this embodiment.

Specifically, receiving interfaces included in the network device 400 are configured to receive service data sent by different network devices.

Figure 4:
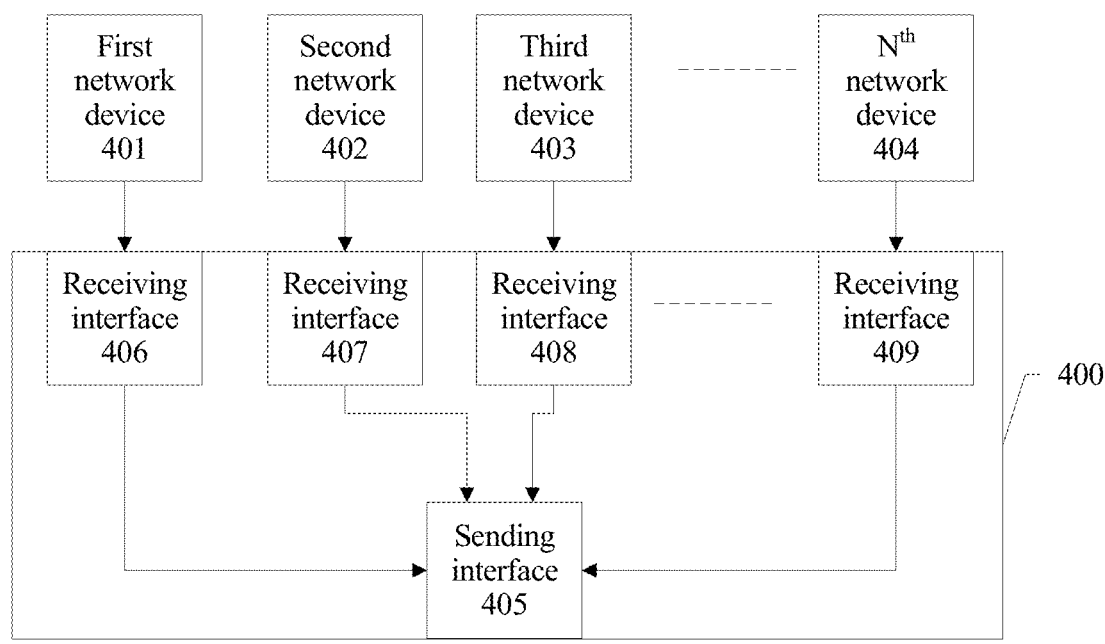
FIG. 4 is a schematic diagram of a hardware structure in an embodiment of a network device in this application.

FIG. 4 is used as an example, the receiving interface 406 is configured to receive the service data sent by the first network device 401, the receiving interface 407 is configured to receive the service data sent by the second network device 402, the receiving interface 408 is configured to receive the service data sent by the third network device 403, and the receiving interface 409 is configured to receive the service data sent by the $N^{th}$ network device 404.

A quantity of receiving interfaces included in the network device 400 is not limited in this embodiment.

A sending interface 405 of the network device is configured to: receive service data sent by the receiving interfaces, and perform service multiplexing by using the service multiplexing method in this application, to form a bit block stream.

A specific quantity of sending interfaces 405 included in the network device is not limited in this embodiment.

Figure 5:
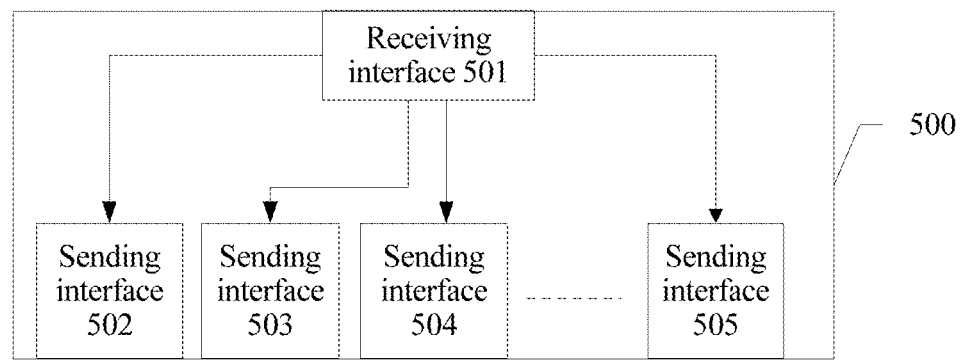
FIG. 5 is a schematic diagram of a hardware structure in another embodiment of a network device in this application.

The embodiment shown in FIG. 4 describes a hardware structure of the network device when the network device is used as the sending device in a communications network. A hardware structure of the network device when the network device is used as a receiving device is described below with reference to an embodiment shown in FIG. 5.

In this embodiment, the network device, used as the receiving device, is configured to receive a multiplexed bit block stream, and the network device is further configured to demultiplex the multiplexed bit block stream.

In this embodiment, a receiving interface 501 of the network device 500 is configured to receive the multiplexed bit block stream.

A specific quantity of receiving interfaces 501 included in the network device is not limited in this embodiment.

The receiving interface 501 is configured to demultiplex the bit block stream by using the service demultiplexing method in this application, to form bit block streams separately corresponding to services. The receiving interface 501 sends the bit block streams corresponding to the services to corresponding sending interfaces. For example, the receiving interface 501 sends a bit block stream of a first service to a sending interface 502, the receiving interface 501 sends a bit block stream of a second service to a sending interface 503, the receiving interface 501 sends a bit block stream of a third service to a sending interface 504, and the receiving interface 501 sends a bit block stream of an $N^{th}$ service to a sending interface 505.

A quantity of sending interfaces included in the network device 500 is not limited in this embodiment.

Based on the foregoing embodiments, a specific process of how a network device used as a sending device performs service multiplexing on received service data is described in detail below with reference to FIG. 6.

This embodiment is described by using an example in which this embodiment is applied to the Ethernet.

Operation 601. Input bit block streams of a plurality of services to corresponding buffers tx_buf.

Specifically, receiving interfaces of the sending device in this embodiment are configured to receive the bit block streams of the plurality of services, and the receiving interfaces may determine the buffers tx_buf separately corresponding to the bit block streams of the services, and further, may input the bit block streams of the plurality of services to the corresponding buffers tx_buf.

In one embodiment, before the receiving interfaces of the sending device input the bit block streams of the plurality of services to the corresponding buffers tx_buf, the sending device may determine whether there is an idle bit block in the bit block streams of the plurality of services. In this embodiment, the idle bit block is a dedicated control bit block used for rate matching in an Ethernet standard, and the idle bit block may be sent when there is no valid data transmission currently.

If the receiving interfaces of the sending device determine that there is the idle bit block in the bit block streams of the plurality of services, the receiving interfaces of the sending device may directly discard the idle bit block.

Operation 602. Perform arbitration on the buffers tx_buf, to generate arbitration result information.

In this embodiment, a multiplexer on a sending interface of the sending device may be configured to perform arbitration on the buffers tx_buf, to generate the arbitration result information used for service multiplexing.

A manner of disposing the multiplexer in this embodiment is described below.

Figure 7:
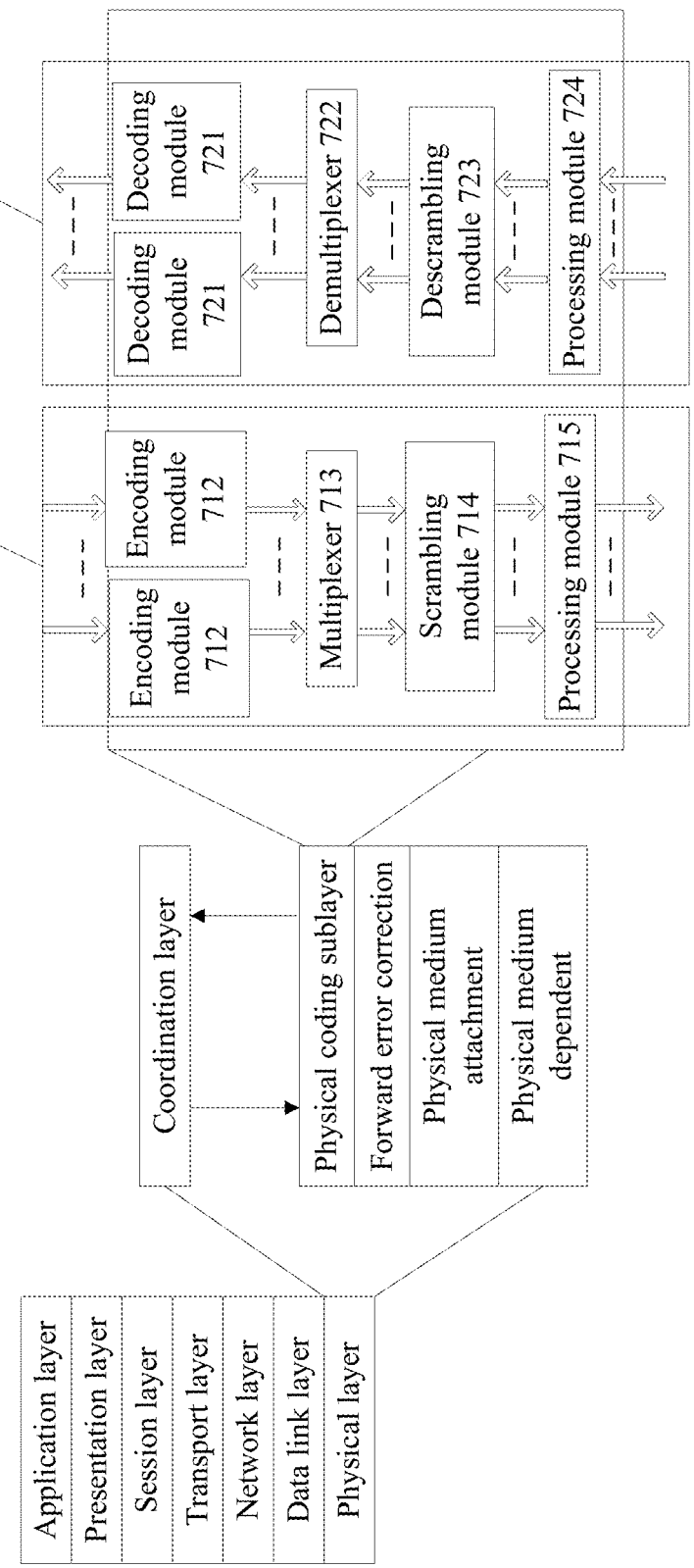
FIG. 7 is a schematic structural diagram of an embodiment of a basic framework of network communication of a network device in this application.

As shown in FIG. 7, in this embodiment, a basic framework of network communication of the sending device is open system interconnection (open system interconnection, OSI). An OSI model divides network communication work of the sending device into seven layers: a physical layer, a data link layer, a network layer, a transport layer, a session layer, a presentation layer, and an application layer.

Specifically, the physical layer includes a physical coding sublayer (physical coding sublayer, PCS), forward error correction (forward error correction, FEC), physical medium attachment (physical medium attachment, PMA), and physical medium dependent (physical medium dependent, PMD).

More specifically, as shown in 71, the physical coding sublayer PCS of the sending device includes a plurality of encoding modules 712 configured to encode service data, the encoding modules 712 are disposed on the receiving interfaces, and the encoding modules 712 may encode the received service data to generate bit block streams, and input the bit block streams to a multiplexer 713.

In this embodiment, any bit block in the bit block streams generated by the encoding modules 712 by encoding the service data is an M1/M2 bit block. M1 represents a quantity of payload bits in each bit block, M2 represents a total quantity of bits in each bit block, M1 and M2 are positive integers, and M2>M1.

In this embodiment, the physical coding sublayer PCS includes the multiplexer 713 configured to multiplex encoded bit block streams of a plurality of services, and the multiplexer 713 is disposed on the sending interface.

The physical coding sublayer PCS further includes a scrambling module 714 and a processing module 715 that are disposed on the sending interface. The scrambling module 714 is configured to perform scrambling processing on a multiplexed bit block stream.

The processing module 715 is configured to: perform corresponding processing on the multiplexed bit block stream, for example, distribute the multiplexed bit block stream to a plurality of physical links, and periodically insert an alignment identifier. It should be clear that the description of the processing performed by the processing module 715 in this embodiment is one embodiment, and is not limited.

A specific process of how the multiplexer performs arbitration on the buffers tx_buf to generate the arbitration result information used for service multiplexing is described below.

The multiplexer determines whether the buffers tx_buf that separately buffers the bit block streams of the services meet a target condition, and the multiplexer performs arbitration on the buffers tx_buf to generate the arbitration result information only when the buffers tx_buf meet the target condition.

In this embodiment, the target condition is that there is to-be-sent data in the buffers tx_buf, and the target condition is further that data sending is allowed under flow control of the bit block streams that are of the services and that are buffered in the buffers tx_buf.

The multiplexer determines the arbitration result information from the plurality of buffers tx_buf meeting the target condition. In this embodiment, the arbitration result information may be used to indicate priorities of sending the bit block streams buffered in the plurality of buffers tx_buf meeting the target condition to the receiving device, so that the sending device sends the bit block streams of the services to the receiving device in descending order of the priorities based on the priorities indicated in the arbitration result information.

In one embodiment, the arbitration result information indicates that the bit block streams separately buffered in the plurality of buffers tx_buf meeting the target condition are sorted in descending order of sending waiting time of the bit block streams buffered in the buffers tx_buf.

In one embodiment, the arbitration result information indicates that the bit block streams separately buffered in the plurality of buffers tx_buf meeting the target condition are sorted in ascending order of sent data traffic of the bit block streams buffered in the buffers tx_buf.

It should be clear that the description of the priorities that are indicated in the arbitration result information and that are of sending the bit block streams separately buffered in the plurality of buffers tx_buf meeting the target condition to the receiving device is one embodiment, and is not limited.

Operation 603. Send a bit block stream of a first service to a receiving device.

In this embodiment, the receiving device determines, from the bit block streams separately buffered in the plurality of buffers tx_buf meeting the target condition and based on the arbitration result information, the bit block stream that is of the first service and that currently needs to be sent to the receiving device.

Operation 604. Determine whether to switch from the first service to a second service for service sending, and performs operation 605 if it is determined to switch from the first service to the second service.

In this embodiment, the multiplexer may determine, based on the arbitration result information, whether to switch from the first service to the second service for service sending.

In one embodiment, a priority sequence indicated in the arbitration result information may be: The sending device sends a bit block stream of the second service after sending the bit block stream of the first service.

In one embodiment, a priority sequence indicated in the arbitration result information may alternatively be: The sending device sends a bit block stream of the second service after sending preset data traffic in the bit block stream of the first service. The preset data traffic is data traffic indicated in the arbitration result information. To be specific, in this embodiment, the sending device may switch to the bit block stream of the second service for service sending before the sending device sends the entire bit block stream of the first service and after the sending device sends the preset data traffic in the bit block stream of the first service.

Operation 605. Insert at least one service switching indication bit block between the bit block stream of the first service and the second bit block stream.

Figure 8:
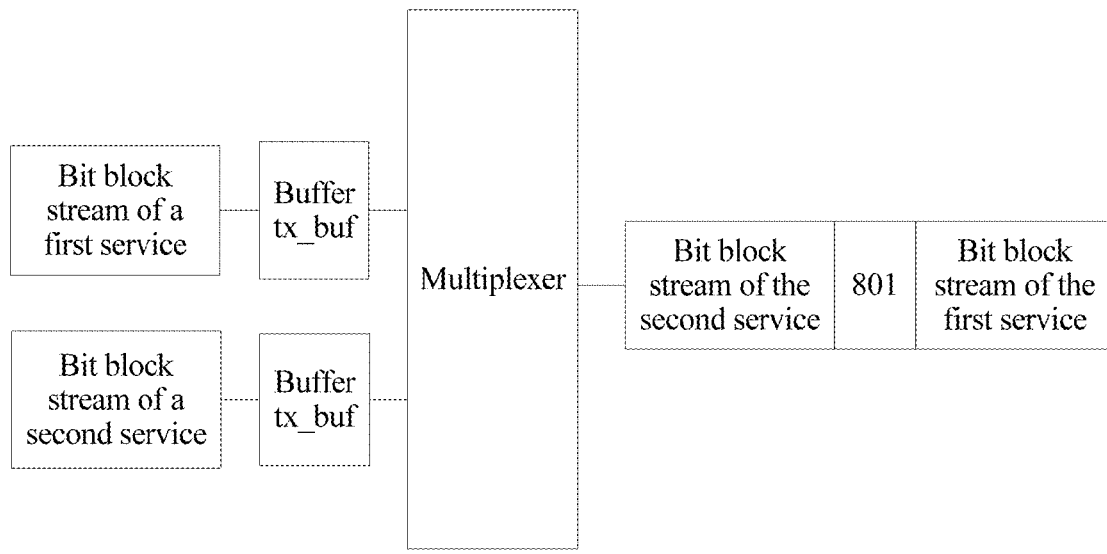
FIG. 8 is a schematic diagram of a process in which a multiplexer multiplexes bit block streams of a plurality of services in this application.

FIG. 8 is used as an example. If the multiplexer may determine, based on the priority sequence indicated in the arbitration result information, that the bit block stream of the first service and the bit block stream of the second service are sequentially sent to the receiving device, the multiplexer inserts at least one service switching indication bit block 801 between the bit block stream of the first service and the bit block stream of the first service.

The at least one service switching indication bit block is used to indicate that the first service is switched to the second service for service sending.

In this embodiment, the at least one service switching indication bit block further includes a target identifier, and the target identifier is an identifier corresponding to the bit block stream of the second service.

In this embodiment, a specific process in which the sending device obtains the target identifier is not limited in this embodiment provided that the sending device can determine the target identifier corresponding to the bit block stream of the second service.

For example, the sending device may receive, in advance, an identifier corresponding to any one of the plurality of services, and the sending device may determine the target identifier corresponding to the second service.

For another example, after receiving the plurality of services, the sending device may configure a corresponding identifier for any one of the plurality of services, and the sending device may determine the target identifier corresponding to the second service from the configured identifier.

It can be learned that when the sending device sends the at least one service switching indication bit block including the target identifier to the receiving device, the receiving device may determine, based on the at least one service switching indication bit block, that a service is switched, and may determine, based on the target identifier, that the service is switched to the bit block stream of the second service.

A quantity of service switching indication bit blocks is not limited in this embodiment.

Operation 606. Send the at least one service switching indication bit block to the receiving device.

In this embodiment, after the sending device sends the bit block stream of the first service to the receiving device, the sending device may send the at least one service switching indication bit block that is inserted between the bit block stream of the first service and the bit block stream of the second service.

Operation 607. Send the bit block stream of the second service to the receiving device.

In this embodiment, the sending device may send the bit block stream of the second service after sending the at least one service switching indication bit block.

It can be learned that the sending device chronologically sends the bit block stream of the first service, the at least one service switching indication bit block, and the bit block stream of the second service based on sending time.

Because statuses of the buffers tx_buf change each time when the sending device performs service switching, the sending device in this embodiment may cyclically perform operation 602 to operation 607 in this embodiment until all to-be-sent bit block streams on the buffers tx_buf meeting the target condition are sent to the receiving device.

Operation 608. If it is detected that none of buffers tx_buf have a to-be-sent bit block stream, send an idle bit block to the receiving device.

In this embodiment, when the multiplexer detects that all the bit block streams on the buffers tx_buf meeting the target condition are sent, the sending device sends the idle bit block to the receiving device.

A beneficial effect of the service multiplexing method provided in this embodiment lies in that service switching of the sending device is not affected by a service currently being transmitted, and service switching can be implemented on any bit block in real time based on needs. In addition, a service switching indication bit block is inserted between bit block streams that require service switching, to perform service switching, thereby reducing a latency and jitter in a service switching process, and ensuring a low latency during service switching.

In this embodiment, the sending device may perform switching to send a service with a high priority before a service with a low priority, so that preemption sending of the service with a high priority is implemented, and a very low latency and very low jitter of the service with a high priority are ensured.

In this embodiment, service multiplexing is implemented by using the buffers, thereby effectively avoiding a bandwidth waste and a transmission latency caused because multiplexing is performed by using exclusive bandwidth.

Figure 6:
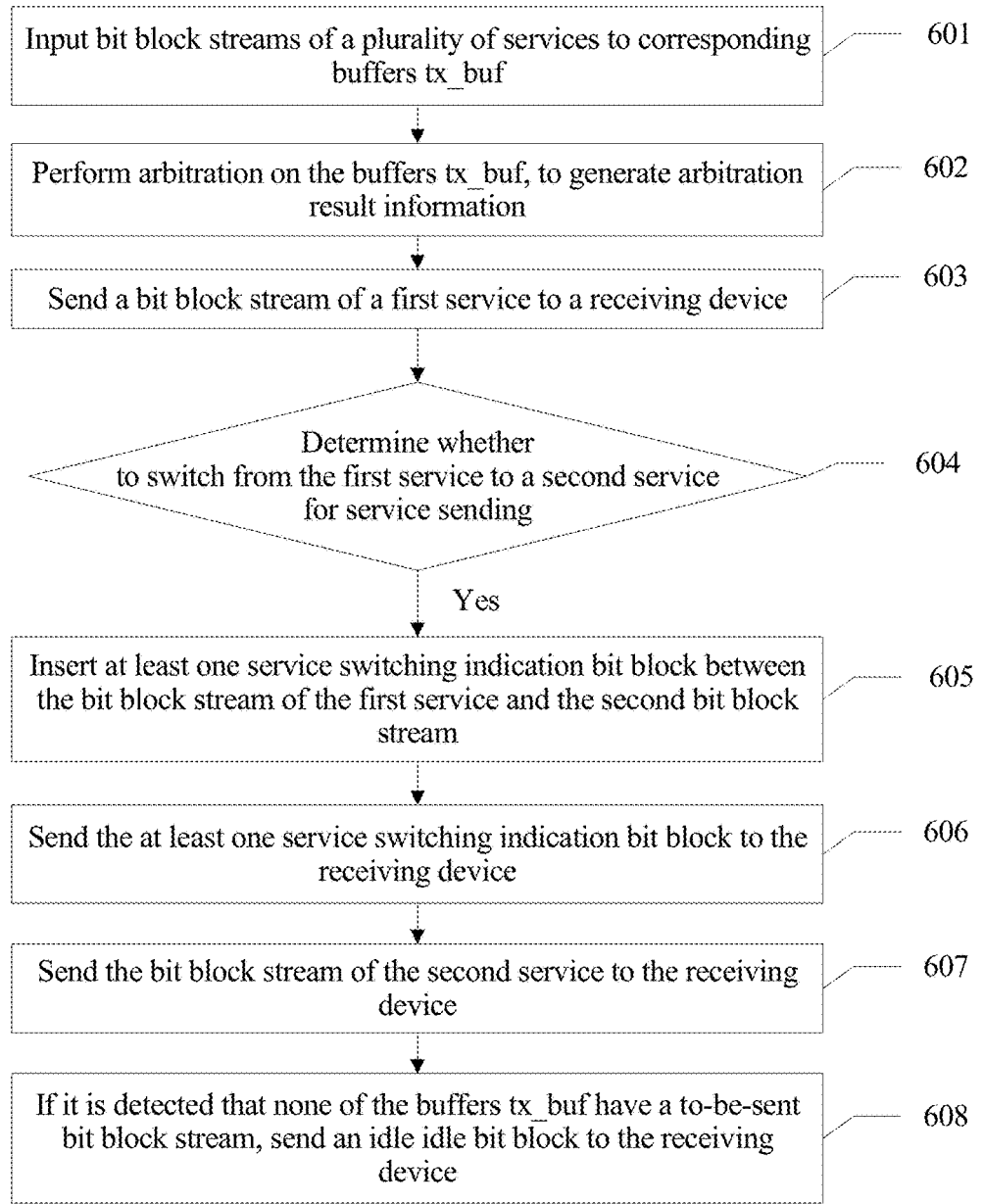
FIG. 6 is a flowchart of operations of an embodiment of a service multiplexing method in this application.
Figure 9:
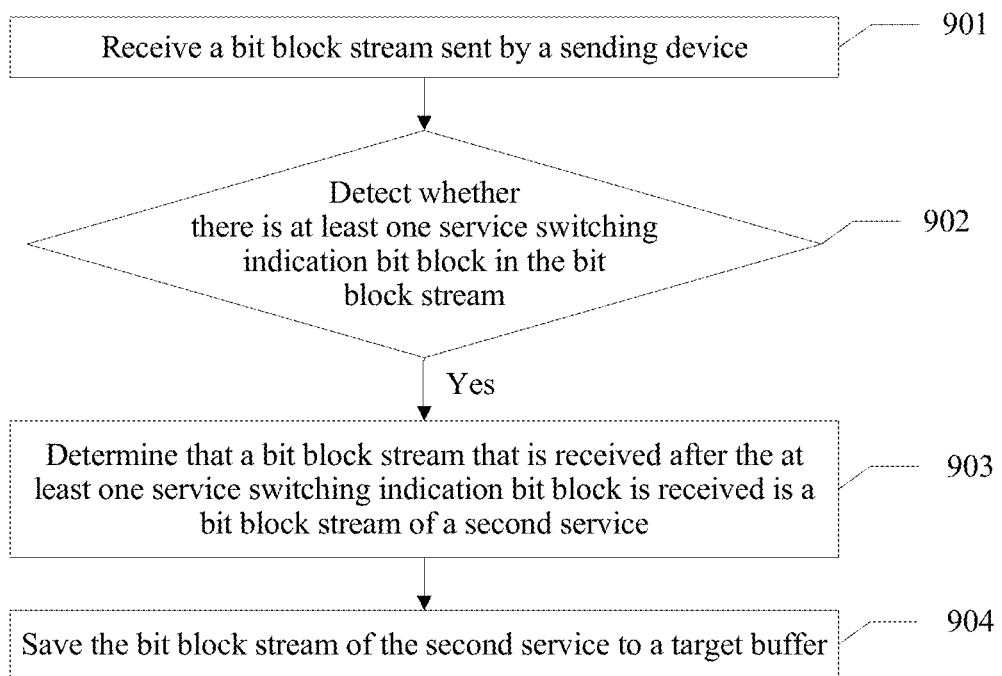
FIG. 9 is a flowchart of operations of an embodiment of a service demultiplexing method in this application.

A specific process of how to perform service multiplexing is described from the perspective of the sending device in the embodiment shown in FIG. 6. A specific process of performing service demultiplexing is described below from the perspective of a receiving device with reference to FIG. 9.

Operation 901. Receive a bit block stream sent by the sending device.

In one embodiment, a receiving interface of the receiving device may determine whether there is an idle bit block in the bit block stream sent by the sending device. If the receiving device determines that there is the idle bit block in the bit block stream, the receiving interface of the receiving device may directly discard the idle bit block.

Operation 902. Detect whether there is at least one service switching indication bit block in the bit block stream, and perform operation 903 if there is the at least one service switching indication bit block in the bit block stream.

In this embodiment, a demultiplexer of the receiving device detects whether each received bit block is the service switching indication bit block.

If the demultiplexer receives one service switching indication bit block or a plurality of consecutive service switching indication bit blocks, operation 903 is performed.

The demultiplexer is disposed on the receiving interface of the receiving device.

A manner of disposing the demultiplexer in this embodiment is described below.

As shown in FIG. 7, for a basic framework of network communication of the receiving device in this embodiment, refer to the basic framework of the network communication of the sending device. Details are not described in this embodiment again.

Specifically, as shown in 72, the physical coding sublayer PCS of the receiving device includes a plurality of processing modules 724. The processing modules 724 are configured to: receive data streams from a plurality of physical links, and align and sort the data streams based on alignment identifiers. It should be clear that the description of processing performed by the processing modules 724 in this embodiment is one embodiment, and is not limited.

The physical coding sublayer PCS further includes a descrambling module 723, and the descrambling module 723 is configured to perform descrambling processing on demultiplexed service data.

The physical coding sublayer PCS further includes a demultiplexer 722, and the demultiplexer 722 is configured to save a bit block stream to a buffer corresponding to the bit block stream.

The physical coding sublayer PCS further includes a decoding module 721, and the decoding module 721 is configured to decode a demultiplexed bit block stream to generate service data.

In this embodiment, any bit block in the bit block stream is an M1/M2 bit block. M1 represents a quantity of payload bits in each bit block, M2 represents a total quantity of bits in each bit block, M1 and M2 are positive integers, and M2>M1.

In one embodiment, after receiving the complete bit block stream sent by the sending device, the receiving device may detect, one by one, bit blocks included in the bit block stream, to determine all service switching indication bit blocks included in the bit block stream.

In one embodiment, after receiving one bit block sent by the sending device, the receiving device may detect the currently received bit block, to determine whether the currently received bit block is the service switching indication bit block.

Operation 903. Determine that a bit block stream that is received after the at least one service switching indication bit block is received is a bit block stream of the second service.

How the demultiplexer determines that the bit block stream that is received after the at least one service switching indication bit block is received is the bit block stream of the second service is described below.

In this embodiment, the receiving device and the sending device may agree on that the at least one service switching indication bit block is used to indicate service switching, and when the demultiplexer receives the at least one service switching indication bit block, the demultiplexer may determine that service switching is performed between a bit block stream of a first service and the bit block stream of the second service.

The bit block stream of the first service is a bit block stream that is received by the receiving device before the receiving device receives the at least one service switching indication bit block, and the bit block stream of the second service is the bit block stream that is received by the receiving device after the receiving device receives the at least one service switching indication bit block.

Specifically, in this embodiment, the at least one service switching indication bit block includes a target identifier, and the target identifier is an identifier corresponding to the bit block stream of the second service.

The receiving device may determine the corresponding bit block stream of the second service based on the target identifier, and the receiving device may determine that the bit block stream of the second service is received after the at least one service switching indication bit block is received.

In one embodiment, the receiving device may receive, in advance, an identifier corresponding to any one of a plurality of services, and after receiving the target identifier sent by the sending device, the receiving device may determine the second service corresponding to the target identifier.

In one embodiment, the receiving device may receive, in advance, an identifier set sent by the sending device, and the identifier set includes an identifier corresponding to any one of the plurality of services. In this case, after receiving the target identifier sent by the sending device, the receiving device may determine the second service corresponding to the target identifier.

It can be learned that when the sending device sends the at least one service switching indication bit block including the target identifier to the receiving device, the receiving device may determine, based on the at least one service switching indication bit block, that a service is switched, and may determine, based on the target identifier, that the service is switched to the bit block stream of the second service.

Operation 904. Save the bit block stream of the second service to a target buffer.

In this embodiment, after the demultiplexer receives the identifier corresponding to any one of the plurality of services, the demultiplexer may allocate a buffer to each identifier, to establish a correspondence between the service and the buffer.

Figure 10:
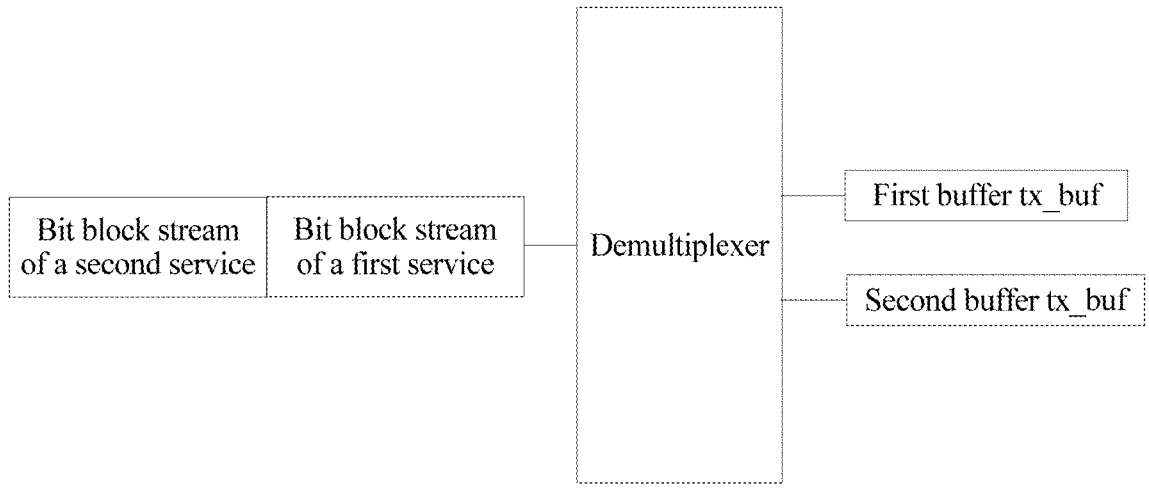
FIG. 10 is a schematic diagram of a process of an embodiment in which a demultiplexer demultiplexes bit block streams in this application.

As shown in FIG. 10, for example, the demultiplexer receives the bit block stream of the first service and the bit block stream of the second service.

The demultiplexer may pre-allocate a first buffer tx_buf to the first service and a second buffer tx_buf to the second service.

When the demultiplexer obtains the target identifier included in the at least one service switching indication bit block, the demultiplexer may determine the pre-allocated target buffer corresponding to the target identifier, and the demultiplexer may save the bit block stream of the second service to the target buffer.

Operation 902 to operation 904 in this embodiment are performed cyclically until a bit block stream that is of any service and that is received by the receiving device is saved to a corresponding buffer.

A beneficial effect of the service demultiplexing method provided in this embodiment lies in that the receiving device determines, in a manner of detecting the service switching indication bit block, that a service is switched, so that service switching can be implemented on any bit block in real time, thereby reducing a latency and jitter in a service switching process, and ensuring a low latency during service switching.

In this embodiment, service demultiplexing is implemented by using the buffers, thereby effectively avoiding a bandwidth waste and a transmission latency caused because demultiplexing is performed by using exclusive bandwidth.

For better understanding of a specific process in which the sending device performs service multiplexing in this application, the specific process in which the sending device performs service multiplexing is described below by way of example with reference to specific service types.

How the sending device implements service multiplexing in a full-duplex mode of the Ethernet is described in this embodiment by way of example.

Figure 11:
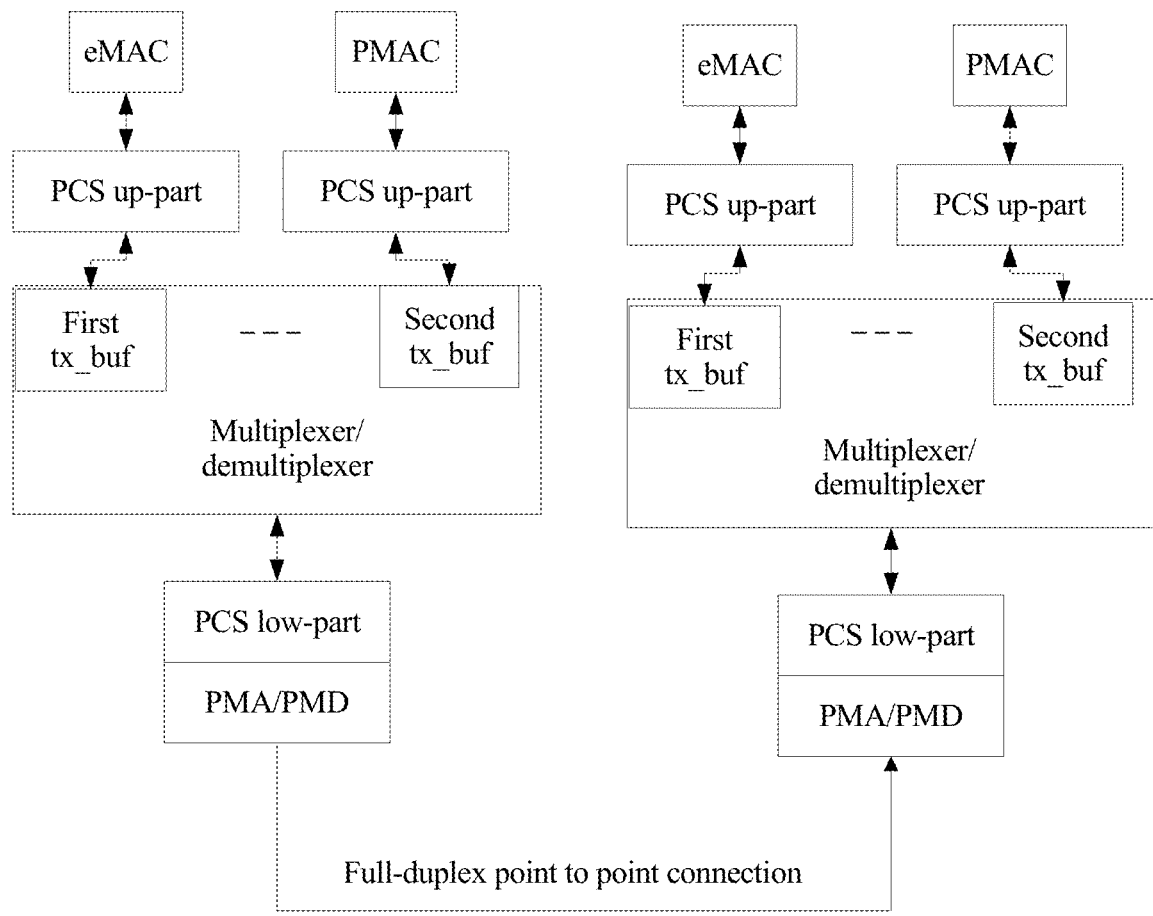
FIG. 11 is a schematic diagram of a process in which a network device multiplexes or demultiplexes services in this application.

As shown in FIG. 11, in this embodiment, for example, all services received by a sending device are Ethernet packet services.

The Ethernet packet services are specifically a latency-sensitive packet service (express media access control, eMAC) and a low-priority packet service (preemptable media access control, pMAC).

Latency sensibility of an eMAC service is higher than latency sensibility of a pMAC service.

Figure 12:
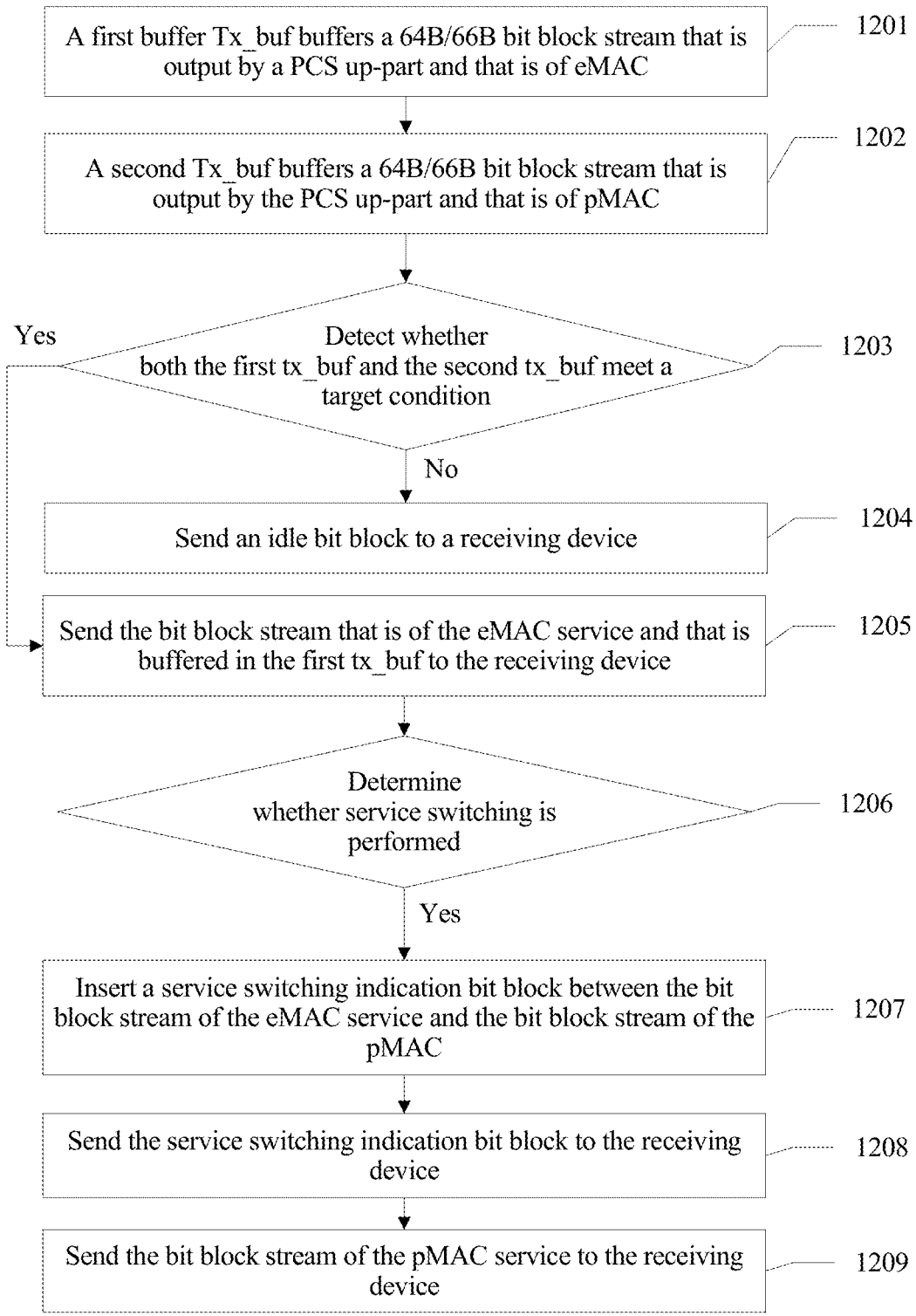
FIG. 12 is a flowchart of operations of another embodiment of a service multiplexing method in this application.

A service multiplexing process in this embodiment is described in detail below with reference to a flowchart of operations shown in FIG. 12.

Operation 1201. A first buffer Tx_buf buffers a 64 B/66 B bit block stream that is output by a PCS up-part and that is of eMAC.

A PCS up-part (The 64 B/66B encoder and decoder part of a PCS, PCS up-part) of the sending device is the encoding modules 712 used for encoding in FIG. 7.

In this embodiment, the first Tx_buf of the sending device is configured to buffer the eMAC service. After receiving the eMAC service, the sending device may buffer the eMAC service into the first Tx_buf corresponding to the eMAC service.

In the Ethernet, a data stream of the eMAC service is a 64 B/66 B bit block stream.

Operation 1202. A second Tx_buf buffers a 64 B/66 B bit block stream that is output by the PCS up-part and that is of pMAC.

In this embodiment, the second Tx_buf of the sending device is configured to buffer the pMAC service. After receiving the pMAC service, the sending device may buffer the pMAC service into the second Tx_buf corresponding to the pMAC service.

In the Ethernet, a data stream of the pMAC service is a 64 B/66 B bit block stream.

In this embodiment, to improve bandwidth utilization, a multiplexer may detect whether there is an idle bit block in the first Tx_buf and the second Tx_buf.

Specifically, the multiplexer may detect whether there is an idle bit block in an inter-packet-gap (inter-packet-gap, IPG) in the 64 B/66 B bit block streams output by the PCS up-part, and if there is the idle bit block, the multiplexer may delete the idle bit block in the IPG.

For specific description of the multiplexer, refer to the foregoing embodiment. Details are not described in this embodiment again.

In one embodiment, the multiplexer may perform flow control on the bit block streams in the buffers, and a specific process is as follows:

The multiplexer may detect the bit block streams in the buffers periodically or in real time, and if the multiplexer detects that a data volume of the bit block streams in the buffers is greater than or equal to a preset threshold, the multiplexer may send, to the sending device, indication information used to instruct to suspend data sending, and the sending device may suspend inputting a bit block stream of a service to the PCS up-part. Then, if the multiplexer detects that a data volume of the bit block streams in the buffers is less than the preset threshold, the multiplexer may send, to the sending device, indication information used to instruct to send data, and the sending device may input a bit block stream of a service to the PCS up-part.

Operation 1203. Detect whether both the first tx_buf and the second tx_buf meet a target condition, and perform operation 1204 if not both the first tx_buf and the second tx_buf meet the target condition, or perform operation 1205 if both the first tx_buf and the second tx_buf meet the target condition.

Specifically, the multiplexer is configured to detect whether both the first tx_buf and the second tx_buf meet the target condition, and this embodiment is described in detail below with reference to a specific structure of the multiplexer.

Figure 13:
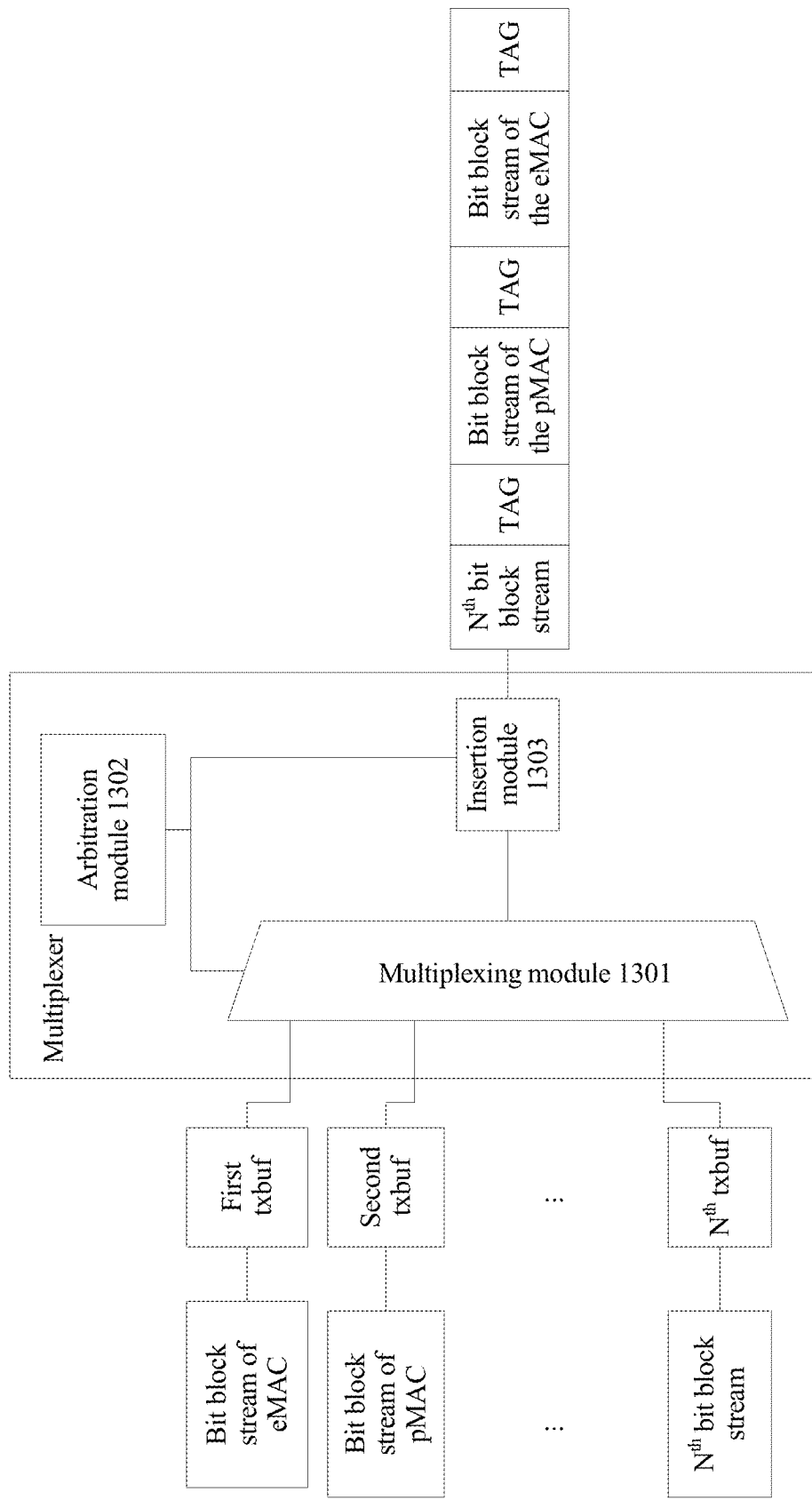
FIG. 13 is a schematic structural diagram of an embodiment of a multiplexer in this application.

As shown in FIG. 13, an arbitration module 1302 in communication connection to the buffers tx_buf in the multiplexer is configured to detect whether both the first tx_buf and the second tx_buf meet the target condition.

In this embodiment, the target condition is that there is to-be-sent data in the first tx_buf and the second tx_buf, and the target condition is further that data sending is allowed under flow control of the bit block streams that are of the services and that are buffered in the first tx_buf and the second tx_buf. For specific description of the target condition, refer to the foregoing embodiment. Details are not described in this embodiment again.

Operation 1204. Send an idle bit block to a receiving device.

Specifically, the multiplexer of the sending device is configured to send the idle bit block to the receiving device.

In this embodiment, if a multiplexing module 1301 in the multiplexer determines that neither the first tx_buf nor the second tx_buf meets the target condition, the multiplexing module 1301 is configured to send the idle bit block to the receiving device.

Operation 1205. Send the bit block stream that is of the eMAC service and that is buffered in the first tx_buf to the receiving device.

Specifically, the arbitration module 1302 in communication connection to the multiplexing module 1301 in the multiplexer may perform arbitration on the bit block streams in the tx_bufs, to determine a first bit block stream in the tx_bufs that is to be sent to the receiving device.

In this embodiment, when the arbitration module 1302 determines that the latency sensibility of the eMAC service is higher than the latency sensibility of the pMAC service, the arbitration module 1302 may determine that the first tx_buf buffering the eMAC service has a higher priority than the buffer buffering the pMAC service, and the arbitration module 1302 may determine that the bit block stream buffered in the first tx_buf is sent to the receiving device.

This embodiment is described by using an example in which priorities of bit block streams sent to the receiving device are determined based on latency sensibility of services.

Operation 1206. Determine whether service switching is performed, and perform operation 1207 if service switching is performed.

In this embodiment, the multiplexing module 1301 in the multiplexer is configured to determine whether service switching is performed. To be specific, the multiplexing module 1301 determines whether the eMAC service is switched to the pMAC service for service sending.

Specifically, the arbitration module 1302 may generate arbitration result information when performing arbitration on the bit block streams in the buffers, the arbitration module 1302 may send the arbitration result information to the multiplexing module 1301, and the multiplexing module 1301 may determine, based on the arbitration result information, whether service switching is performed.

For specific description of the arbitration result information, refer to the foregoing embodiment. Details are not described in this embodiment again.

Operation 1207. Insert a service switching indication bit block between the bit block stream of the eMAC service and the bit block stream of the pMAC.

When the multiplexing module 1301 determines, based on the arbitration result information, that the service switching indication bit block needs to be inserted, an insertion module 1303 in communication connection to the multiplexing module 1301 may insert the service switching indication bit block between the bit block stream of the eMAC service and the bit block stream of the pMAC service.

In this embodiment, the service switching indication bit block is a tag bit block, and there is at least one TAG bit block.

The service switching indication bit block is described in detail below.

In this embodiment, in Ethernet, the service switching indication bit block is a 64 B/66 B bit block. M2-M1, namely, 66-64, represents a bit quantity of a header synchronization header in each bit block.

Figure 22:
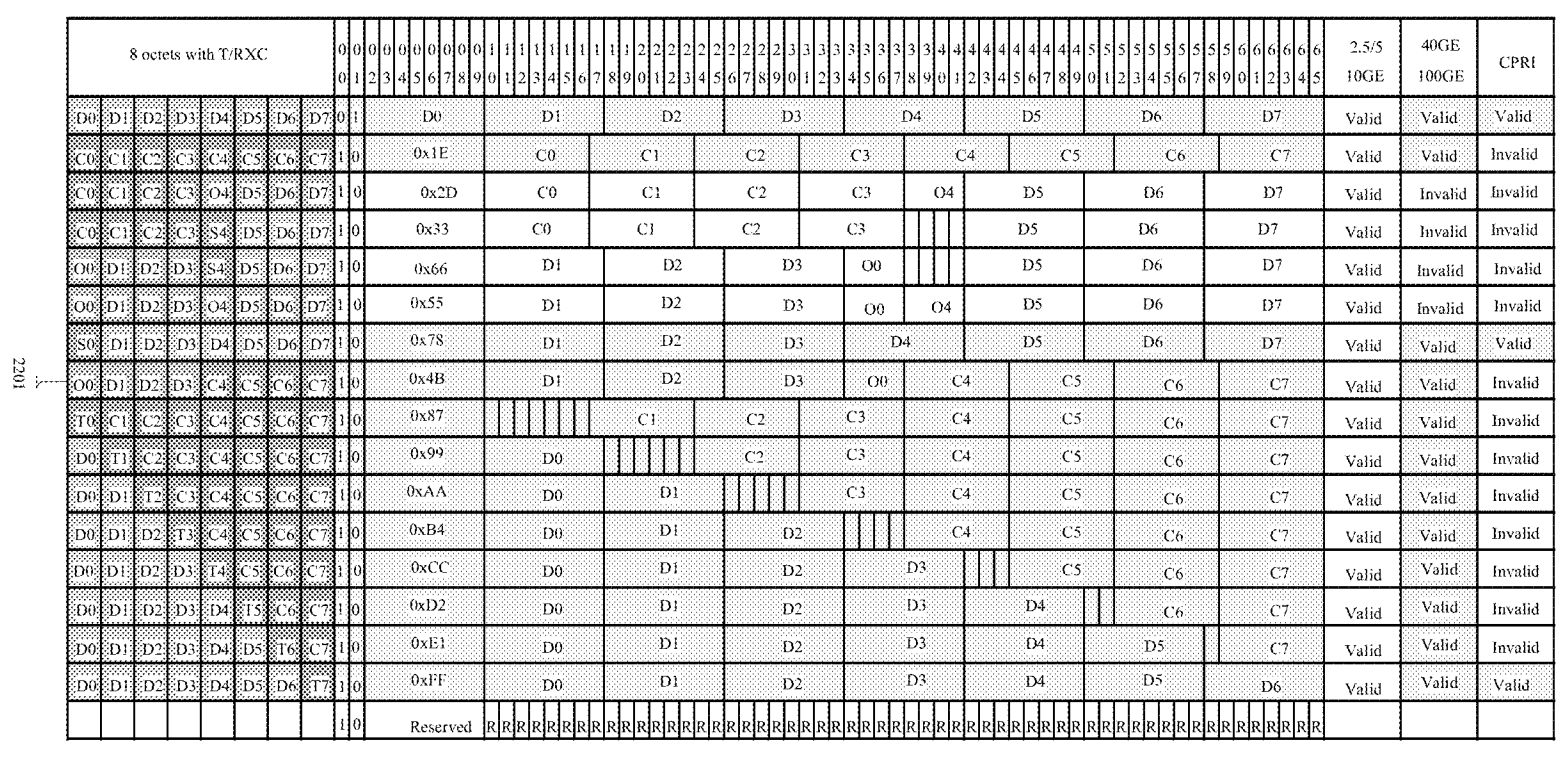

This embodiment is described by using an example in which there is one service switching indication bit block. For a structure of a codeword of the 64 B/66 B bit block, refer to FIG. 22.

In this embodiment, the service switching indication bit block is described by using an example in which the service switching indication bit block includes parameters O0, D1, D2, D3, C4, C5, C6, and C7.

The parameters D1, D2, and D3 are 8-bit data, the parameters C4, C5, C6, and C7 are 7-bit data, and the parameter O0 is a 4-bit control code used to indicate a category of a bit block including the parameter O0. In this embodiment, the parameter O0 is used to make such a definition that the bit block including the parameter O0 is used to indicate that service switching is performed.

Specifically, in this embodiment, the sending device sets a value of O0 to 0x4, to identify the bit block including the parameter O0 as a service switching indication bit block.

In this embodiment, that the value of O0 is set to 0x4 is one embodiment, and the value of O0 may alternatively be set to another value not defined in an existing standard.

The parameters D1, D2, and D3 included in the service switching indication bit block carry 3-byte parameters. The 3-byte parameters carried in D1, D2, and D3 may be used to transmit a target identifier. The target identifier is an identifier corresponding to the bit block stream of the pMAC service.

In this embodiment, the description that the target identifier is transmitted by using D1, D2, and D3 is one embodiment, and is not limited. In specific application, the target identifier may be transmitted by using any one of the parameters D1, D2, D3, C4, C5, C6, and C7, or the target identifier may be transmitted by using a plurality of service switching indication bit blocks.

For description of the target identifier, refer to the foregoing embodiment. Details are not described in this embodiment again.

In one embodiment, the service switching indication bit block further includes indication information, and the indication information is used to indicate a quantity of bit blocks included in the bit block stream that is of the pMAC service and that is sent to the receiving device.

In this embodiment, the indication information may be transmitted by using any one of the parameters D1, D2, D3, C4, C5, C6, and C7 included in the service switching indication bit block stream, or the indication information may be transmitted by using a plurality of service switching indication bit blocks.

In one embodiment, in a process in which the arbitration module 1302 performs arbitration on the pMAC service, the arbitration module 1302 may determine that all bit blocks included in the pMAC service are sent to the receiving device, and the indication information included in the service switching indication bit block inserted by the insertion module 1303 may indicate a quantity of all bit blocks of the pMAC service.

In one embodiment, in a process in which the arbitration module 1302 performs arbitration on the pMAC service, the arbitration module 1302 may determine that not all bit blocks included in the pMAC service are sent to the receiving device, in other words, some bit blocks included in the pMAC service are sent. In this case, the indication information included in the service switching indication bit block inserted by the insertion module 1303 may include a quantity of bit blocks of the pMAC service that need to be sent to the receiving device.

Operation 1208. Send the service switching indication bit block to the receiving device.

Operation 1209. Send the bit block stream of the pMAC service to the receiving device.

In this embodiment, the sending device may send the bit block stream of the pMAC service after sending the service switching indication bit block.

It can be learned that the sending device chronologically sends the bit block stream of the eMAC service, the service switching indication bit block, and the bit block stream of the pMAC service based on sending time.

Operation 1210. If it is detected that none of buffers tx_buf have a to-be-sent bit block stream, send the idle bit block to the receiving device.

In this embodiment, when the multiplexer detects that both the bit block streams on the first tx_buf and the second tx_buf that meet the target condition are sent, the sending device sends the idle bit block to the receiving device.

It should be clear that the description of the modules included in the multiplexer in this embodiment is one embodiment, and is not limited, provided that the multiplexer can perform the service multiplexing process in this embodiment.

This embodiment is described by using an example in which this embodiment is applied to an Ethernet packet service. Service multiplexing in this application may alternatively be applied to a low-speed network.

In this application manner, there are a plurality of service switching indication bit blocks, and the service switching indication bit blocks are 8 B/10 B bit blocks.

In one embodiment, this embodiment is described by using an example in which there are four service switching indication bit blocks.

For a structure of the service switching indication bit block, refer to Table 1:

TABLE 1

| Codeword code | Ordered code group ordered set | Length of a code group number of code groups | Code-group encoding Encoding |
|---|---|---|---|
| /I 1/ | Idle 1 | 2 | /K28.5/D5.6/ |
| /I 2/ | Idle 2 | 2 | /K28.5/D16.2/ |

For 8 B/10B encoding, the structure of the service switching indication bit block may be K28.5/D18.6/DX,Y/DX,Y, or the structure of the bit block may be K28.5/D1.2/DX,Y/DX,Y.

For example, for 64 B/66B encoding, service switching may be indicated by using a single bit block, and for 8 B/10B encoding, a plurality of bit blocks need to be bound together for service switching.

Specifically, in this embodiment, for example, the structure of the service switching indication bit block is K28.5/D18.6/DX,Y/DX,Y. The bit block K28.5 is a special bit block, the bit block (Dx.y) following the special bit block is a data bit block. In 8 B/10B encoding, the special bit block and the data bit block are used together to indicate service switching.

Figure 14:
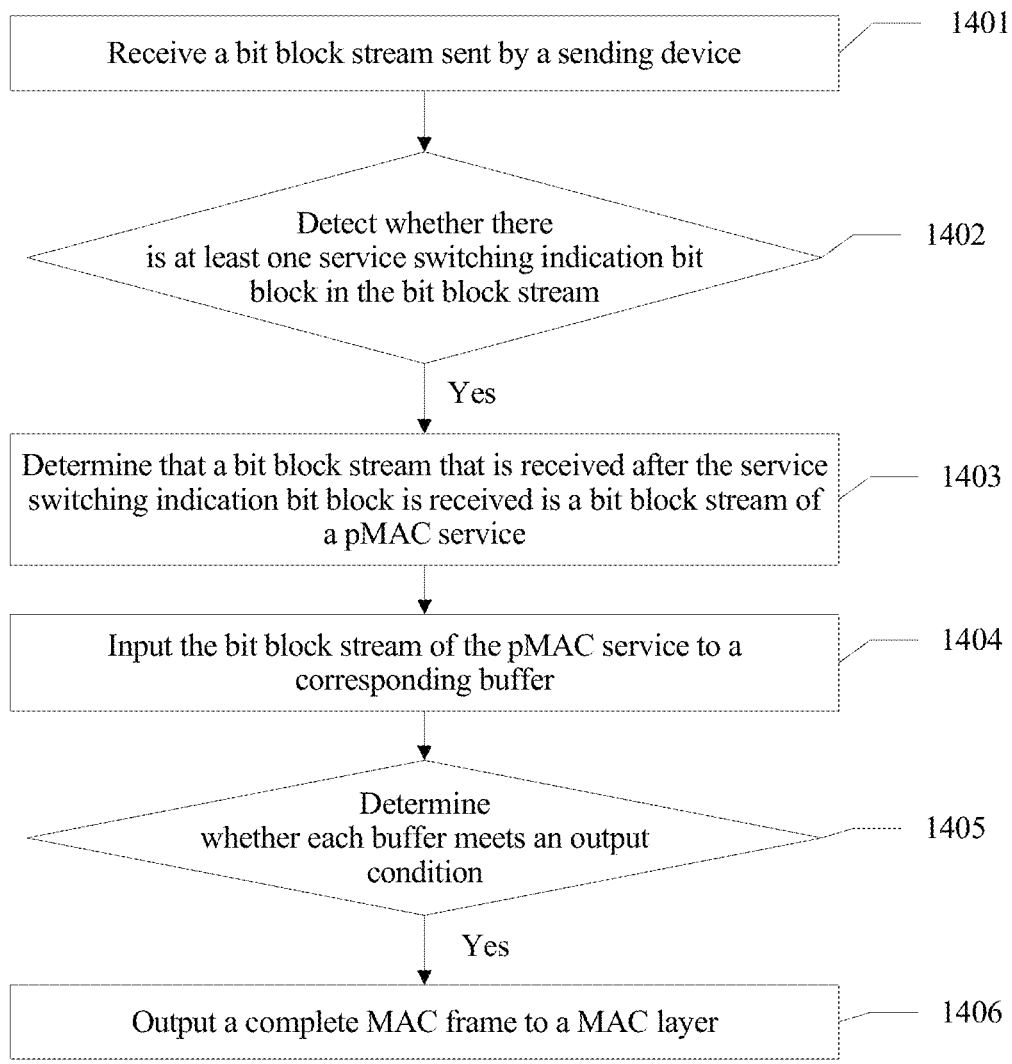
FIG. 14 is a flowchart of operations of another embodiment of a service demultiplexing method in this application.

A specific process in which a receiving device performs service demultiplexing is described below by way of example with reference to FIG. 11 and FIG. 14.

As shown in FIG. 11, in this embodiment, for example, all services sent by a sending device and received by the receiving device are Ethernet packet services.

The Ethernet packet services are specifically a latency-sensitive packet service (express media access control, eMAC) and a low-priority packet service (preemptable media access control, pMAC).

Latency sensibility of an eMAC service is higher than latency sensibility of a pMAC service.

Operation 1401. Receive a bit block stream sent by a sending device.

As shown in FIG. 11, a PCS low-part (the 64 B/66B encoder and decoder part of a PCS, PCS low-part) of a receiving device is configured to receive the bit block stream sent by the sending device.

The PCS low-part of the receiving device is a descrambling module 723 and a processing module 724 in a PCS shown in FIG. 7.

In this embodiment, if the receiving device detects that the bit block stream includes an idle bit block, the receiving device may directly delete the idle bit block.

Figure 15:
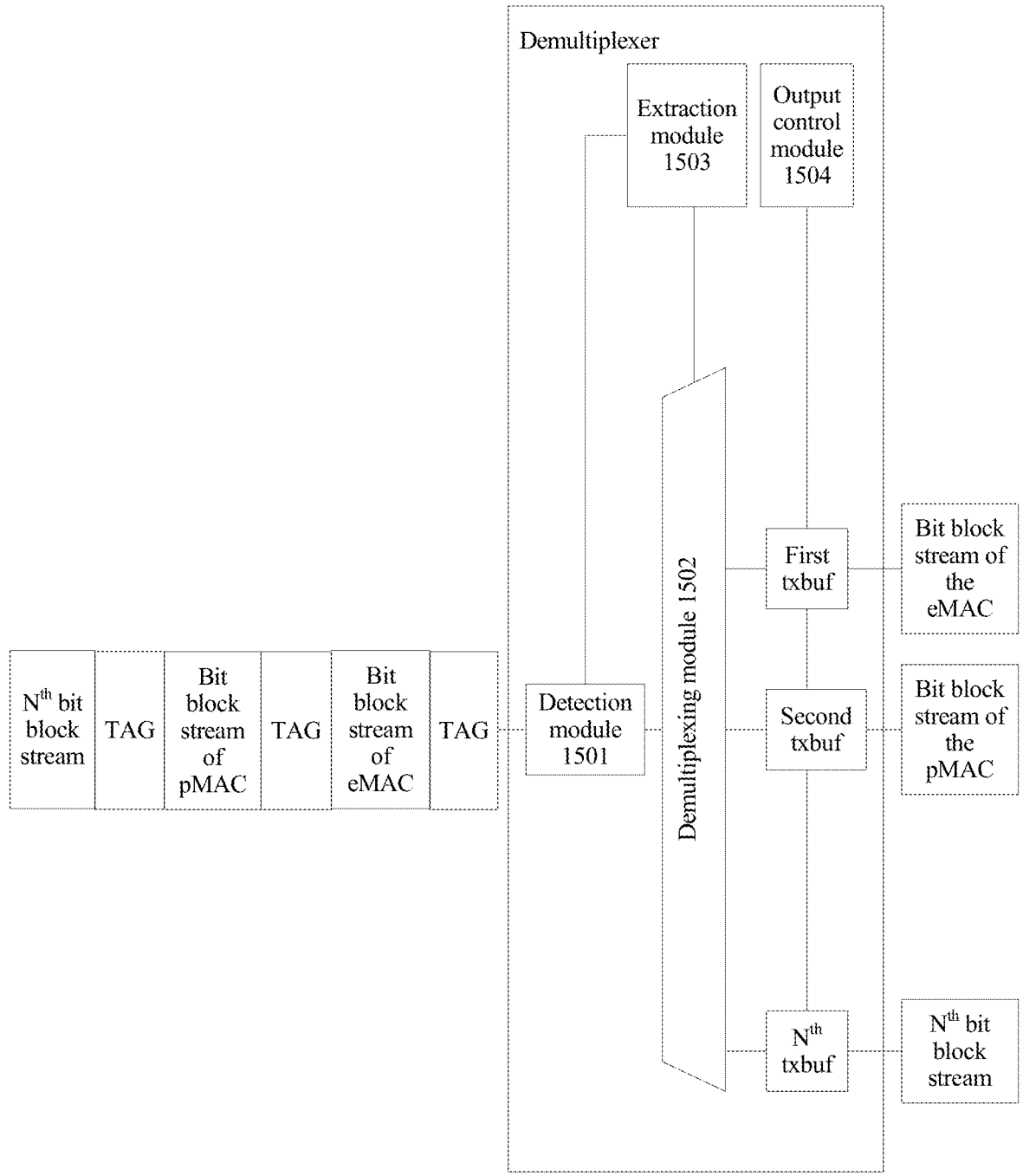
FIG. 15 is a schematic structural diagram of an embodiment of a demultiplexer in this application.

Specifically, as shown in FIG. 15, a detection module 1501 included in a demultiplexer of the receiving device is configured to detect an idle bit block, and if the detection module 1501 detects the idle bit block, the detection module 1501 may directly delete the idle bit block.

Operation 1402. Detect whether there is at least one service switching indication bit block in the bit block stream, and perform operation 1403 if there is the at least one service switching indication bit block in the bit block stream.

In this embodiment, it is detected whether each bit block in the bit block stream received by the demultiplexer is a service switching indication bit block. If the demultiplexer receives one service switching indication bit block or a plurality of consecutive service switching indication bit blocks, operation 1403 is performed.

For specific description of the demultiplexer, refer to the foregoing embodiment. Details are not described again.

The service switching indication bit block is a 64 B/66 B bit block. For specific description of the 64 B/66 B bit block, refer to the foregoing description. Details are not described again.

Operation 1403. Determine that a bit block stream that is received after the service switching indication bit block is received is a bit block stream of a pMAC service.

In this embodiment, the service switching indication bit block is used to indicate service switching, and a target identifier included in the service switching indication bit block is used to indicate that a service is switched to the pMAC service.

Operation 1404. Input the bit block stream of the pMAC service to a corresponding buffer.

In this embodiment, after the detection module 1501 detects the service switching indication bit block, an extraction module 1503 in communication connection to the detection module 1501 may extract the target identifier included in the service switching indication bit block.

For specific description of the target identifier, refer to the foregoing description. Details are not described in this embodiment again.

A demultiplexing module 1502 in communication connection to the extraction module 1503 determines the corresponding buffer based on the target identifier.

This embodiment is described by using an example in which a bit block stream that is received by the receiving device before the receiving device receives the service switching indication bit block is a bit block stream of an eMAC service and the bit block stream that is received by the receiving device after the receiving device receives the service switching indication bit block is the bit block stream of the pMAC service. For specific description of the eMAC service and the pMAC service, refer to the foregoing description. Details are not described again.

Before the receiving device receives the service switching indication bit block, the demultiplexing module 1502 saves the bit block stream of the eMAC service to a first tx_buf pre-configured for the eMAC service. After determining the target identifier, the demultiplexing module 1502 may determine that the target buffer corresponding to the target identifier is the second tx_buf, and may input the subsequently received bit block stream of the pMAC service to the second tx_buf.

Operation 1405. Determine whether each buffer meets an output condition, and perform operation 1406 when each buffer meets the output condition.

An output control module 1504 in the demultiplexer may be configured to detect whether each buffer meets the output condition. The output condition is whether each buffer stores a complete Ethernet Media Access Control (media access control, MAC) frame.

Specifically, in the Ethernet, MAC layer data output to the receiving device is based on a complete MAC frame.

When the control module 1504 determines that a bit block stream stored in a buffer is not a complete MAC frame, the control module 1504 may buffer and perform frame splicing on the bit block stream by using the buffer until a complete MAC frame is obtained through frame splicing.

Operation 1406. Output a complete MAC frame to a MAC layer.

Specifically, when the control module 1504 determines that a bit block stream stored in a buffer is a complete MAC frame, the control module 1504 may control the buffer storing the complete MAC frame to output the complete MAC frame to the MAC layer.

It should be clear that the description of the modules included in the demultiplexer in this embodiment is one embodiment, and is not limited, provided that the demultiplexer can perform the service demultiplexing process in this embodiment.

The foregoing embodiment is described by using an Ethernet packet service as an example, and a specific process of how the sending device performs service multiplexing on a non-Ethernet packet service and an Ethernet packet service is described in detail in the following embodiment.

Figure 16:
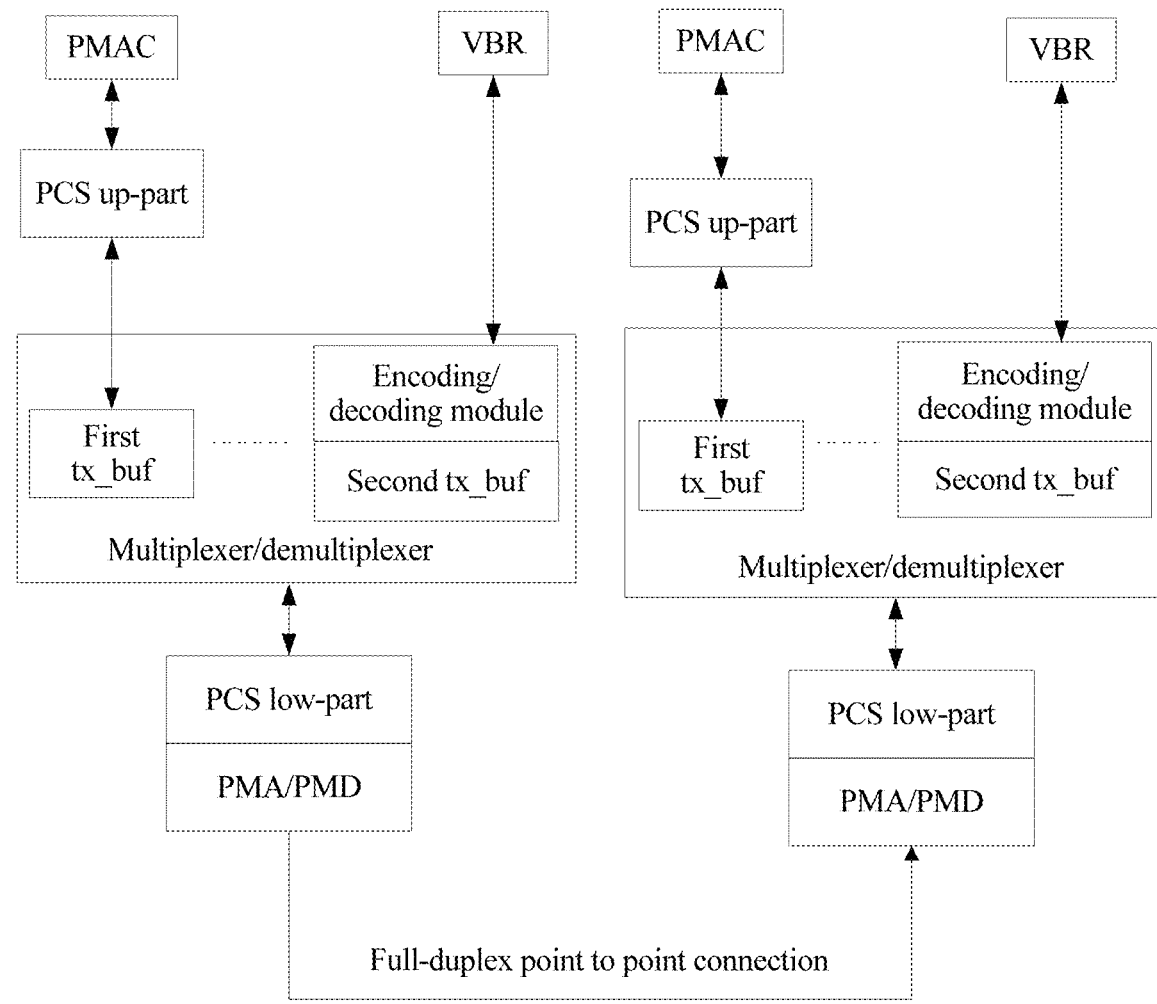
FIG. 16 is a schematic diagram of a process of another embodiment in which a network device multiplexes or demultiplexes services in this application.

As shown in FIG. 16, the Ethernet packet service is a pMAC service. For specific description of the pMAC service, refer to the foregoing description. Details are not described again.

For example, the non-Ethernet packet service is a streaming service. The streaming service is a constant bit rate (constant bit rate, CBR) service or a variable bit rate (variable bit rate, VBR) service.

This embodiment is described by using an example in which the streaming service is a VBR service.

A service multiplexing process in this embodiment is described in detail below with reference to a flowchart of operations shown in FIG. 17.

Operation 1701. A first Tx_buf buffers a 64 B/66 B bit block stream that is output by a PCS up-part and that is of pMAC.

For specific description of the PCS up-part, refer to the foregoing description. Details are not described again.

In this embodiment, the first Tx_buf of the sending device is configured to buffer the pMAC service. After receiving the pMAC service, the sending device may buffer the pMAC service into the first Tx_buf corresponding to the pMAC service.

Operation 1702. Encode a VBR service.

In this embodiment, because the streaming service does not include PCS layer-related logic, an encoding module of a receiving device needs to perform 64 B/66B encoding on the VBR service to generate a bit block stream.

For specific description of the encoding module, refer to the foregoing description. Details are not described again.

Operation 1703. A second Tx_buf buffers a 64 B/66 B bit block stream output by an encoding module.

In this embodiment, to improve bandwidth utilization, a multiplexer may detect whether there is an idle bit block in the first Tx_buf and the second Tx_buf, and if there is the idle bit block, the multiplexer may delete the idle bit block in an IPG.

For specific description of the multiplexer, refer to the foregoing embodiment. Details are not described in this embodiment again.

The multiplexer may perform flow control on the bit block stream in the buffer. For a specific process, refer to the foregoing description. Details are not described again.

Operation 1704. Detect whether both the first tx_buf and the second tx_buf meet a target condition, and perform operation 1705 if not both the first tx_buf and the second tx_buf meet the target condition, or perform operation 1706 if both the first tx_buf and the second tx_buf meet the target condition.

Specifically, the multiplexer is configured to detect whether both the first tx_buf and the second tx_buf meet the target condition. For a specific structure of the multiplexer, refer to FIG. 18. For specific description of the multiplexing module 1801, the arbitration module 1802, and the insertion module 1803 included in the multiplexer shown in FIG. 18, refer to the description of the multiplexing module 1301, the arbitration module 1302, and the insertion module 1303 included in the multiplexer shown in FIG. 13. Details are not described again.

More specifically, in this embodiment, the arbitration module 1802 is configured to detect whether both the first tx_buf and the second tx_buf meet the target condition. For specific description of the target condition, refer to the foregoing description. Details are not described again.

Operation 1705. Send an idle bit block to a receiving device.

Specifically, if the multiplexing module 1801 determines that neither the first tx_buf nor the second tx_buf meets the target condition, the multiplexing module 1801 is configured to send the idle bit block to the receiving device.

Operation 1706. Send the bit block stream that is of the pMAC service and that is buffered in the first tx_buf to the receiving device.

Specifically, the arbitration module 1802 may perform arbitration on the bit block streams in the tx_bufs, to determine a first bit block stream in the tx_bufs that is to be sent to the tx_buf of the receiving device.

In this embodiment, if the arbitration module 1802 determines that the first tx_buf buffering the pMAC service has a higher priority than the buffer buffering the VBR service, the arbitration module 1802 may send the bit block stream buffered in the first tx_buf to the receiving device.

Operation 1707. Determine whether service switching is performed, and perform operation 1708 if service switching is performed.

In this embodiment, the multiplexing module 1801 is configured to determine whether service switching is performed, to be specific, the multiplexing module 1801 determines whether switching is performed between the pMAC service and the VBR service.

Specifically, the arbitration module 1802 may generate arbitration result information when performing arbitration on the bit block streams in the buffers, the arbitration module 1802 may send the arbitration result information to the multiplexing module 1801, and the multiplexing module

1801 may determine, based on the arbitration result information, whether service switching is performed.

For specific description of the arbitration result information, refer to the foregoing embodiment. Details are not described in this embodiment again.

Operation 1708. Insert a service switching indication bit block between the bit block stream of the pMAC service and the bit block stream of the VBR service.

When the multiplexing module 1801 determines that the service switching indication bit block TAG needs to be inserted, the insertion module 1803 may insert the service switching indication bit block between the bit block stream of the pMAC service and the bit block stream of the VBR service.

For specific description of the service switching indication bit block in this embodiment, refer to the foregoing embodiments. Details are not described in this embodiment again.

Operation 1709. Sequentially send the service switching indication bit block and the bit block stream of the VBR service to the receiving device.

After the service switching indication bit block is inserted between the bit block stream of the pMAC service and the bit block stream of the VBR service, the sending device may sequentially send the service switching indication bit block and the bit block stream of the VBR service to the receiving device.

It should be clear that the description of the modules included in the multiplexer in this embodiment is one embodiment, and is not limited, provided that the multiplexer can perform the service multiplexing process in this embodiment.

Figure 17:
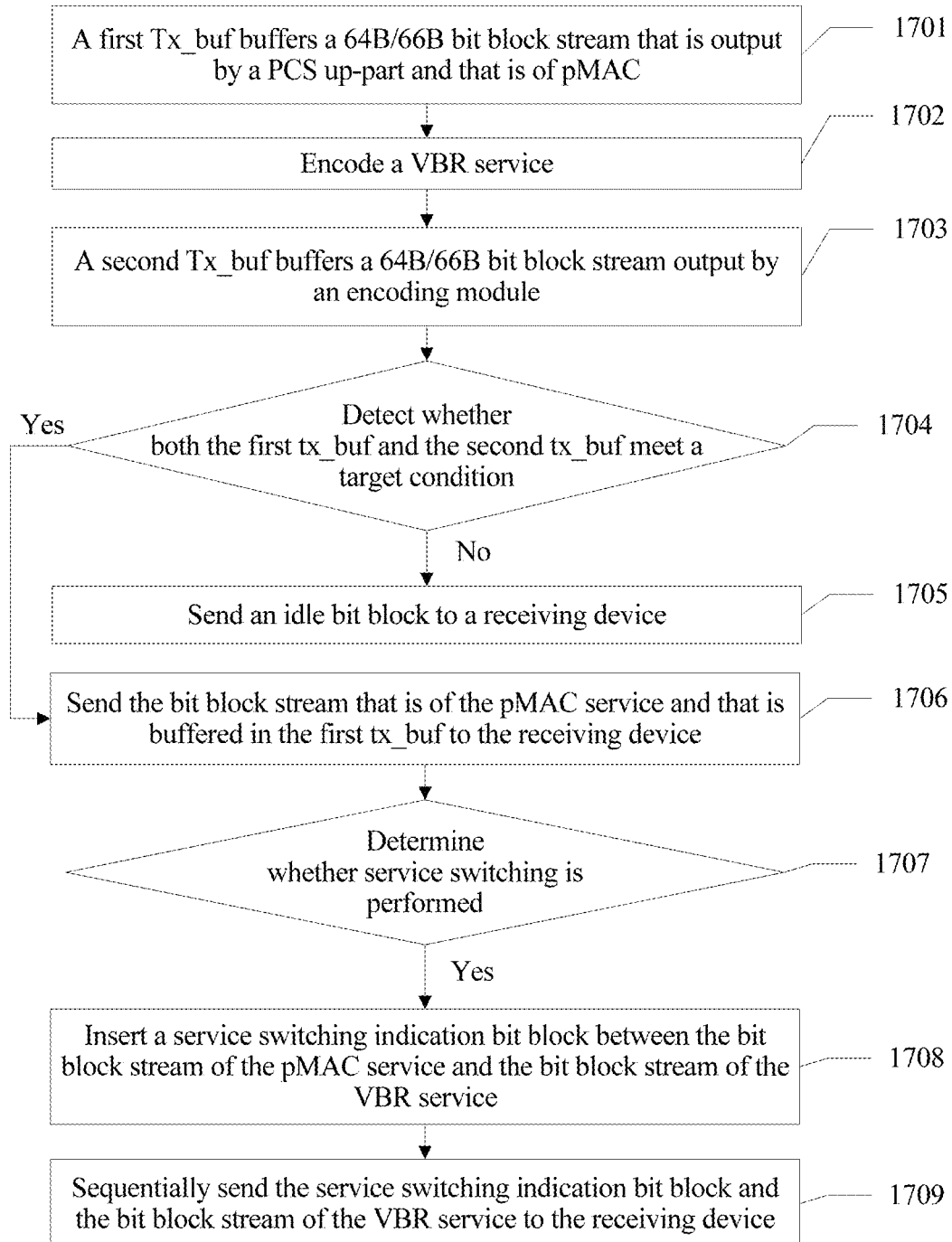
FIG. 17 is a flowchart of operations of another embodiment of a service demultiplexing method in this application.
Figure 18:
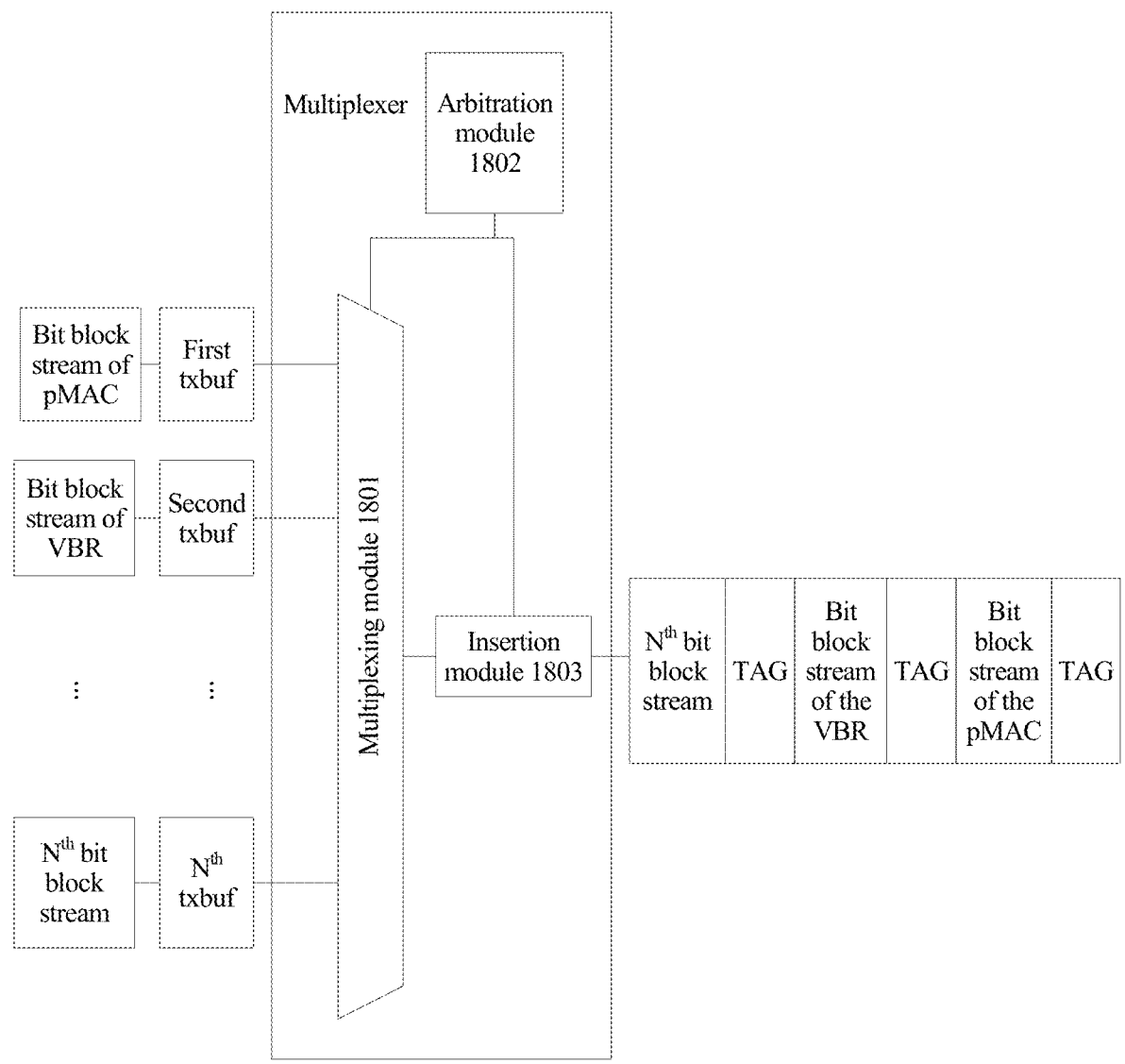
FIG. 18 is a schematic structural diagram of an embodiment of a multiplexer in this application.

As shown in FIG. 16 to FIG. 18, the specific process of performing service multiplexing on the non-Ethernet packet service and the Ethernet packet service is described from the perspective of the sending device. A specific process of demultiplexing the non-Ethernet packet service and the Ethernet packet service is described in detail below from the perspective of a receiving device.

Still referring to FIG. 16, this embodiment is described by using an example in which the Ethernet packet service is a pMAC service and the non-Ethernet packet service is a VBR service.

Figure 19:
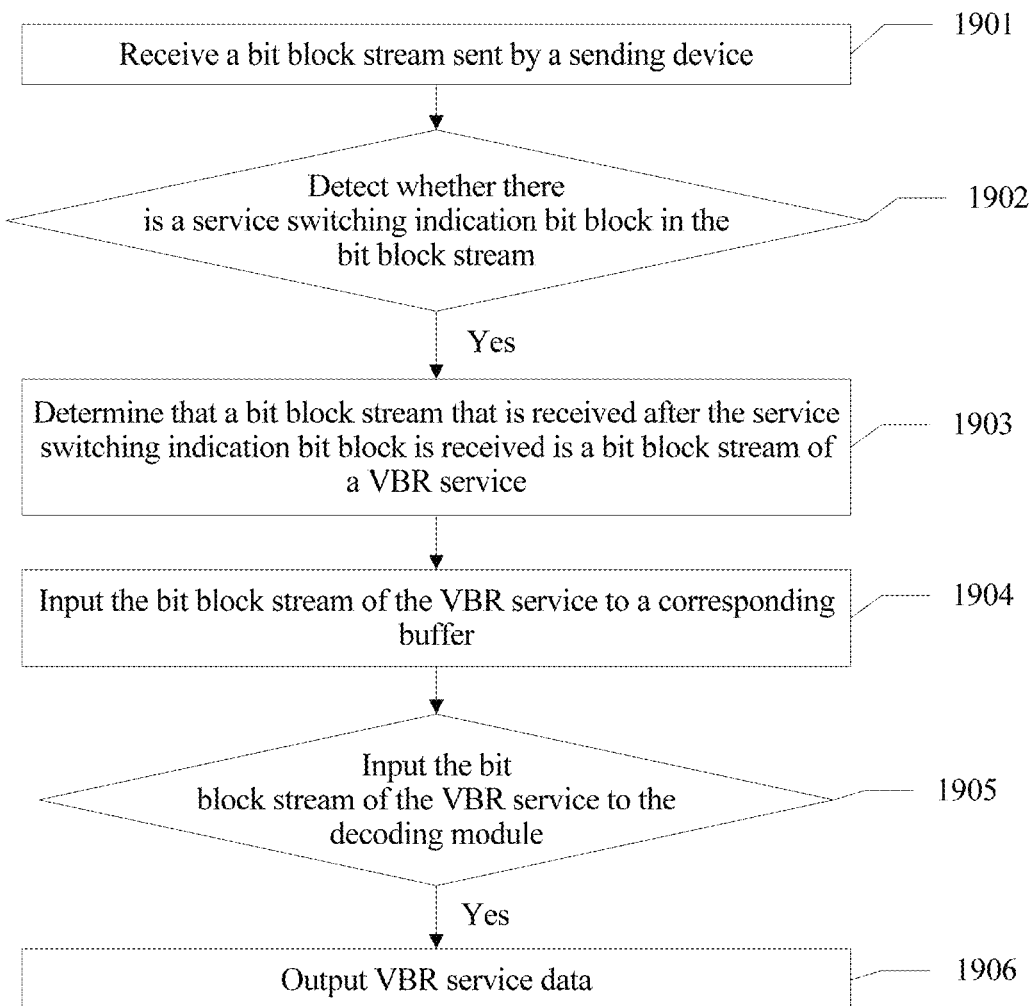
FIG. 19 is a flowchart of operations of another embodiment of a service demultiplexing method in this application.

A service demultiplexing process in this embodiment is described in detail below with reference to a flowchart of operations shown in FIG. 19.

Operation 1901. Receive a bit block stream sent by a sending device.

As shown in FIG. 16, a PCS low-part of a receiving device receives a bit block sent by the sending device.

In this embodiment, if the receiving device detects that the bit block stream includes an idle bit block, the receiving device may directly delete the idle bit block.

Figure 20:
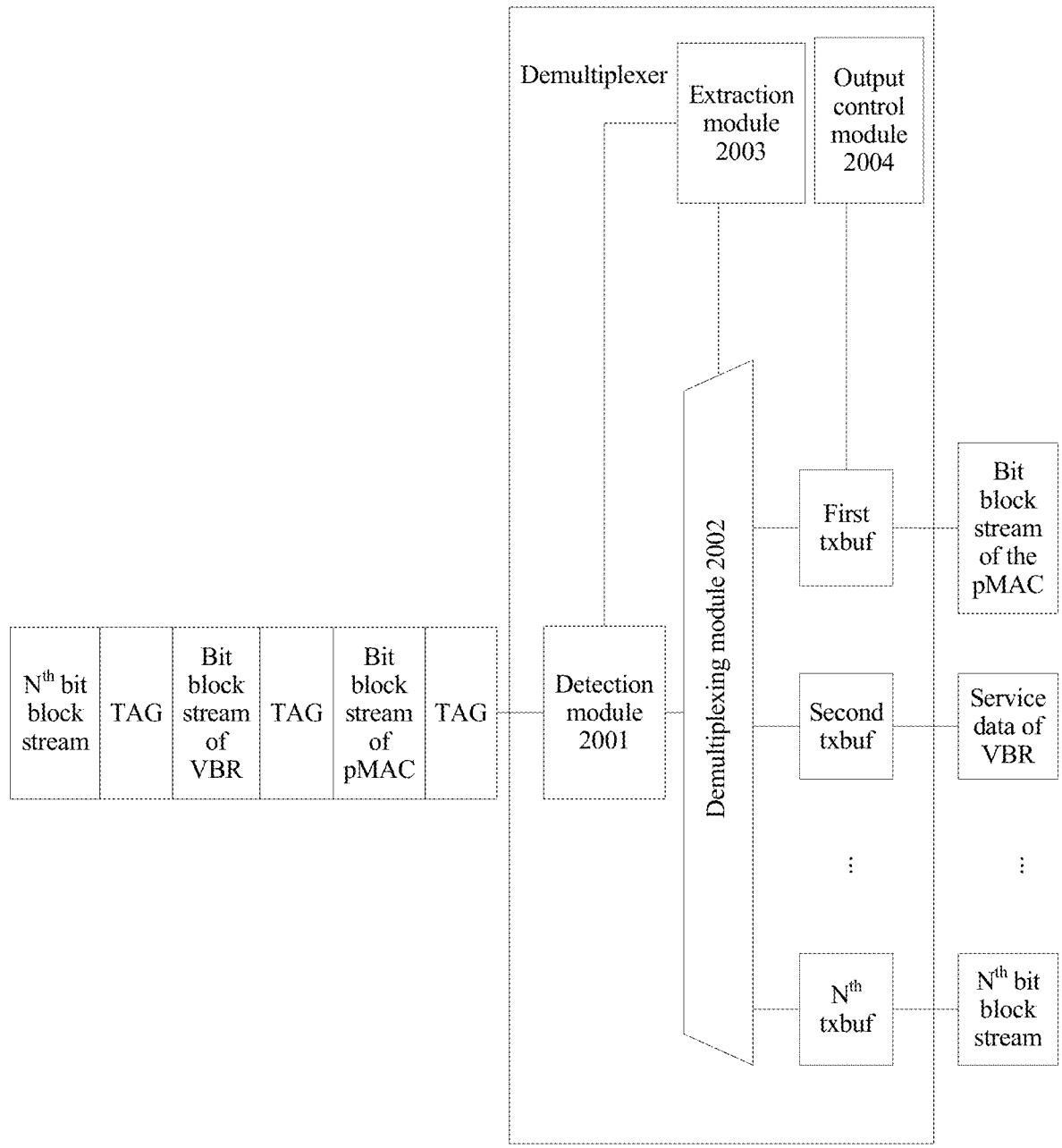
FIG. 20 is a schematic structural diagram of an embodiment of a demultiplexer in this application.

Specifically, as shown in FIG. 20, a detection module 2001 included in a demultiplexer of the receiving device is configured to detect an idle bit block, and if the detection module 2001 detects the idle bit block, the detection module 2001 may directly delete the idle bit block.

Operation 1902. Detect whether there is a service switching indication bit block in the bit block stream, and perform operation 1903 if there is the service switching indication bit block in the bit block stream.

In this embodiment, the demultiplexer is configured to detect whether the bit block is a service switching indication bit block. For specific description of the demultiplexer, refer to the foregoing embodiment. Details are not described again.

The service switching indication bit block is a 64 B/66 B bit block. For specific description of the 64 B/66 B bit block, refer to the foregoing description. Details are not described again.

Operation 1903. Determine that a bit block stream that is received after the service switching indication bit block is received is a bit block stream of a VBR service.

In this embodiment, the service switching indication bit block is used to indicate service switching, and a target identifier included in the service switching indication bit block is used to indicate that a service is switched to the VBR service.

Operation 1904. Input the bit block stream of the VBR service to a corresponding buffer.

In this embodiment, after the detection module 2001 detects the service switching indication bit block, an extraction module 2003 in communication connection to the detection module 2001 may extract the target identifier included in the service switching indication bit block.

For specific description of the target identifier, refer to the foregoing description. Details are not described in this embodiment again.

A demultiplexing module 2002 in communication connection to the extraction module 2003 determines the corresponding buffer based on the target identifier.

This embodiment is described by using an example in which a bit block stream that is received by the receiving device before the receiving device receives the service switching indication bit block is a bit block stream of a pMAC service and the bit block stream that is received by the receiving device after the receiving device receives the service switching indication bit block is the bit block stream of the VBR service. For specific description of the VBR service and the pMAC service, refer to the foregoing description. Details are not described again.

Before the receiving device receives the service switching indication bit block, the demultiplexing module 2002 saves the bit block stream of the pMAC service to a first tx_buf pre-configured for the pMAC service. After determining the target identifier, the demultiplexing module 2002 may determine that the target buffer corresponding to the target identifier is the second tx_buf, and may input the subsequently received bit block stream of the VBR service to the second tx_buf.

Operation 1905. Input the bit block stream of the VBR service to the decoding module.

In this embodiment, for a streaming service VBR, an output control module 2004 does not need to perform frame splicing, and the receiving device may directly input the bit block stream of the VBR service to the decoding module for decoding.

For specific description of the decoding module, refer to the foregoing description. Details are not described in this embodiment again.

The decoding module is configured to decode the bit block stream of the VBR service and output VBR service data.

Operation 1906. Output VBR service data.

In this embodiment, the decoding module may output the decoded VBR service data.

In this embodiment, for example, the receiving device may output, to a common public radio interface (common public radio interface, CPRI), the VBR service data output by the decoding module.

Description of a network to which the service multiplexing method and the service demultiplexing method in this application are applied is one embodiment, and is not limited. For example, the service multiplexing method and the service demultiplexing method in this application may also be applied to flexible Ethernet (flex Ethernet, FlexE).

Figure 21:
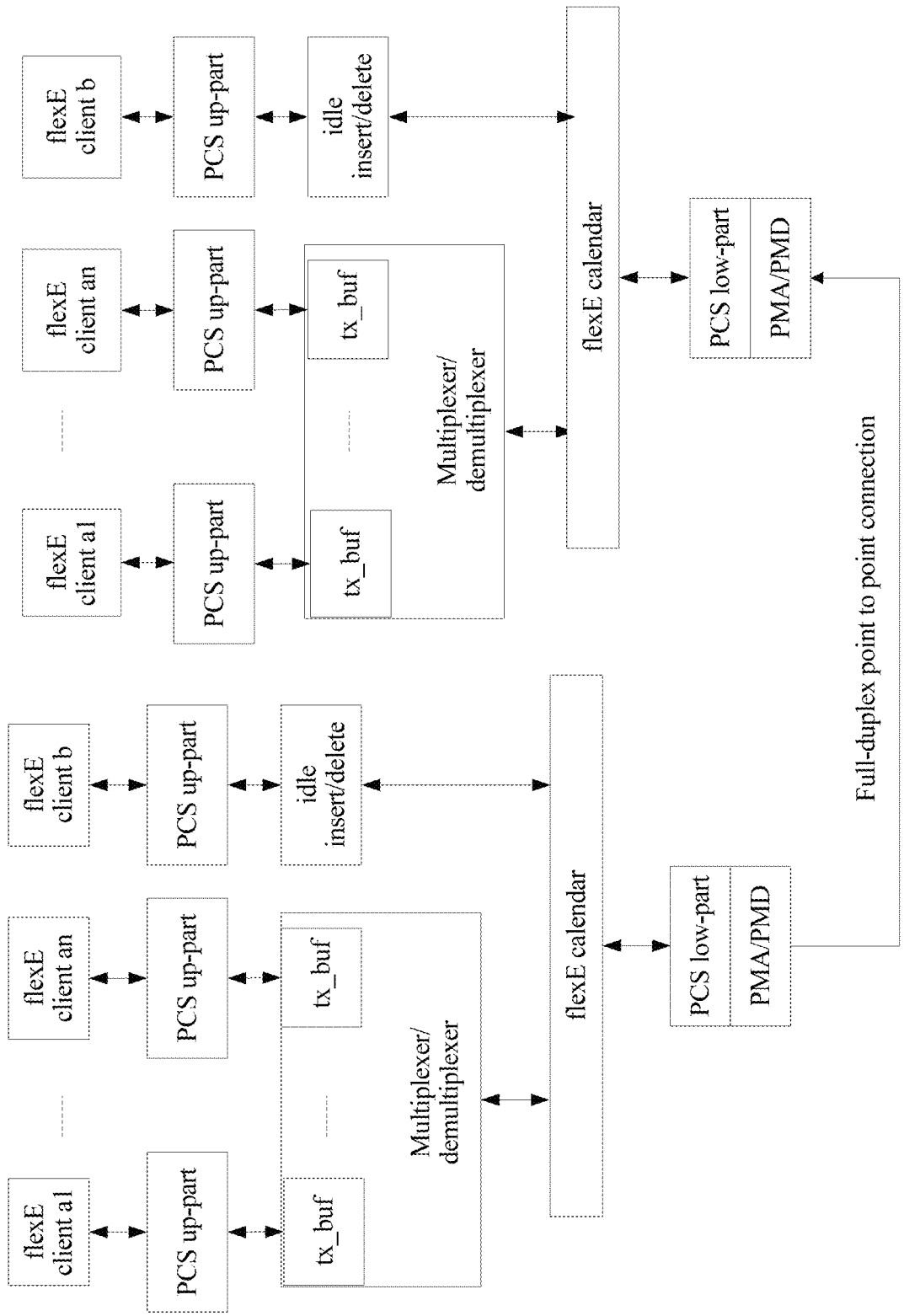
FIG. 21 is a schematic diagram of a process of another embodiment in which a network device multiplexes or demultiplexes services in this application.

As shown in FIG. 21, the network device can implement service multiplexing on a service flexE client a1 to a service flexE client an.

Specifically, a multiplexer performs level-1 service multiplexing on the service flexE client a1 to the service flexE client an. For a specific multiplexing process, refer to the foregoing embodiment. Details are not described again.

Bit block streams that are of the service flexE client a1 to the service flexE client an and that are output by the multiplexer after the multiplexer processes the service flexE client a1 to the service flexE client an are input to a flexE calendar module calendar, and the flexE calendar is configured to perform level-2 multiplexing on the bit block streams of the service flexE client a1 to the service flexE client an by using a method in a flexE standard.

In this embodiment, a service flexE client b is a service based on flexE multiplexing. After an idle bit block insert or delete module performs idle bit block insertion or deletion on a bit block stream of the service flexE client b, the bit block stream is input to the flexE calendar.

The idle insert or delete module is configured to perform rate adaptation on the bit block stream of the service flexE client b.

The flexE calendar is configured to perform timeslot mapping on the bit block stream of the service flexE client b by using the method in the flexE standard, to perform service sending.

As shown in FIG. 21, a process in which the network device implements demultiplexing may be:

After receiving a bit block stream, the flexE calendar demultiplexes the bit block stream to obtain the bit block streams of the service flexE client a1 to the service flexE client an and the bit block stream of the flexE client b.

The flexE calendar inputs the bit block streams of the service flexE client a1 to the service flexE client an to a demultiplexer for demultiplexing, to separately obtain the bit block streams of the service flexE client a1 to the service flexE client an, and inputs the bit block streams to buffers corresponding to the service flexE client a1 to the service flexE client an. For a specific demultiplexing process, refer to the foregoing embodiment. Details are not described in this embodiment again.

The flexE calendar inputs the demultiplexed bit block stream of the flexE client b to the idle insert or delete module, and the idle insert or delete module is configured to perform rate adaptation on the bit block stream of the flexE client b.

Figure 23:
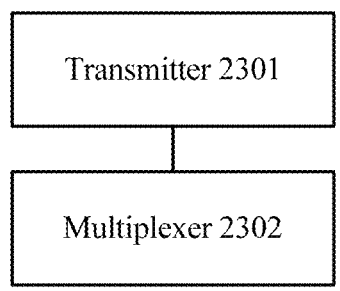
FIG. 23 is a schematic structural diagram of an embodiment of a sending device in this application.

An embodiment structure of the sending device provided in this application is described below by way of example with reference to FIG. 23. The sending device in this embodiment is configured to perform the service multiplexing method in this application. For a specific process of performing the service multiplexing method, refer to the foregoing embodiments. Details are not described in this embodiment again.

The sending device in this embodiment includes:

a transmitter 2301, configured to send a bit block stream of a first service to a receiving device; and a multiplexer 2302, configured to determine whether to switch from the first service to a second service for service sending.

The transmitter 2301 is further configured to: if the multiplexer determines to switch from the first service to the second service for service sending, send at least one service switching indication bit block to the receiving device, where the at least one service switching indication bit block is used to indicate that the first service is switched to the second service for service sending.

The transmitter 2301 is further configured to send a bit block stream of the second service to the receiving device.

In this embodiment, the transmitter 2301 and the multiplexer 2302 are disposed on a sending interface in the foregoing embodiments. Specifically, for specific description of the multiplexer 2302, refer to the foregoing embodiments.

For a beneficial effect of a process in which the sending device in this embodiment performs service multiplexing provided in this application, refer to the foregoing embodiments. Details are not described in this embodiment again.

In one embodiment, any bit block included in the bit block stream of the first service, any bit block included in the bit block stream of the second service, and any one of the at least one service switching indication bit block are M1/M2 bit blocks, where M1 represents a quantity of payload bits in each bit block, M2 represents a total quantity of bits in each bit block, M1 and M2 are positive integers, and M2>M1.

For specific description of any bit block included in the bit block stream of the first service, any bit block included in the bit block stream of the second service, and any one of the at least one service switching indication bit block, refer to the foregoing embodiments. Details are not described in this embodiment again.

In one embodiment, the transmitter 2301 is specifically configured to:

obtain first service data of the first service;

encode the first service data to generate the bit block stream of the first service;

obtain second service data of the second service; and encode the second service data to generate the bit block stream of the second service.

In one embodiment, if the M1/M2 bit block is a 64 B/66 B bit block, there is at least one service switching indication bit block.

For specific description of the 64 B/66 B bit block in this embodiment, refer to the foregoing embodiments. Details are not described in this embodiment again.

In one embodiment, if the M1/M2 bit block is an 8 B/10 B bit block, there are a plurality of service switching indication bit blocks, and the plurality of service switching indication bit blocks include at least one special bit block and at least one data bit block.

For specific description of the 8 B/10 B bit block in this embodiment, refer to the foregoing embodiments. Details are not described in this embodiment again.

In one embodiment, the at least one service switching indication bit block further includes indication information, and the indication information is used to indicate a quantity of bit blocks included in the bit block stream that is of the second service and that is sent to the receiving device.

For specific description of the indication information in this embodiment, refer to the foregoing embodiments. Details are not described in this embodiment again.

In one embodiment, the multiplexer 2302 is further configured to: determine a target identifier, where the target identifier is an identifier corresponding to the second service; and generate the at least one service switching indication bit block, where the at least one service switching indication bit block includes the target identifier, the target identifier is used to instruct the receiving device to save the bit block stream of the second service to a target buffer, and the target buffer is a buffer allocated by the receiving device to the target identifier.

For specific description of the target identifier in this embodiment, refer to the foregoing embodiments. Details are not described in this embodiment again.

In one embodiment, the multiplexer 2302 is further configured to: if it is determined that there is an idle bit block in the bit block stream of the first service and/or the bit block stream of the second service, delete the idle bit block.

For an idle bit block deletion process, refer to the foregoing embodiments. Details are not described in this embodiment.

Figure 24:
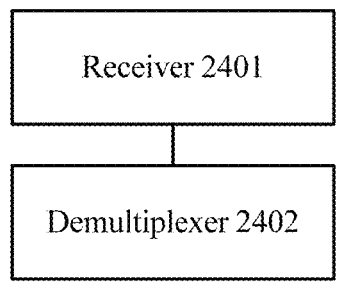
FIG. 24 is a schematic structural diagram of an embodiment of a receiving device in this application.

An embodiment structure of the receiving device provided in this application is described below by way of example with reference to FIG. 24. The receiving device in this embodiment is configured to perform the service demultiplexing method in this application. For a specific process of performing the service demultiplexing method, refer to the foregoing embodiments. Details are not described in this embodiment again.

The receiving device in this embodiment includes:

a receiver 2401, configured to determine whether at least one service switching indication bit block sent by a sending device is received, where the at least one service switching indication bit block is used to indicate that the sending device switches from a first service to a second service for service sending, and a bit block stream of the first service is a bit block stream that is received before the at least one service switching indication bit block is received; and a demultiplexer 2402, configured to: if it is determined that the at least one service switching indication bit block is received, determine that a bit block stream that is received after the at least one service switching indication bit block is received is a bit block stream of the second service.

For a beneficial effect of a process in which the receiving device in this embodiment performs service demultiplexing provided in this application, refer to the foregoing embodiments. Details are not described in this embodiment again.

In this embodiment, the receiver 2401 and the demultiplexer 2402 are disposed on a receiving interface in the foregoing embodiments. Specifically, for specific description of the demultiplexer 2402, refer to the foregoing embodiments.

In one embodiment, any bit block included in the bit block stream of the first service, any bit block included in the bit block stream of the second service, and any one of the at least one service switching indication bit block are M1/M2 bit blocks, where M1 represents a quantity of payload bits in each bit block, M2 represents a total quantity of bits in each bit block, M1 and M2 are positive integers, and M2>M1.

For specific description of any bit block included in the bit block stream of the first service, any bit block included in the bit block stream of the second service, and any one of the at least one service switching indication bit block in this embodiment, refer to the foregoing embodiments. Details are not described in this embodiment again.

In one embodiment, the receiver 2401 is further configured to receive the bit block stream that is of the first service and that is sent by the sending device.

The demultiplexer 2402 is further configured to decode the bit block stream of the first service, to obtain first service data of the first service.

The receiver 2401 is further configured to receive the bit block stream that is of the second service and that is sent by the sending device.

The demultiplexer 2402 is further configured to decode the bit block stream of the second service, to obtain first service data of the second service.

In one embodiment, if the M1/M2 bit block is a 64 B/66 B bit block, there is at least one service switching indication bit block.

For specific description of the 64 B/66 B bit block in this embodiment, refer to the foregoing embodiments. Details are not described in this embodiment again.

In one embodiment, if the M1/M2 bit block is an 8 B/10 B bit block, there are a plurality of service switching indication bit blocks, and the plurality of service switching indication bit blocks include at least one special bit block and at least one data bit block.

For specific description of the 8 B/10 B bit block in this embodiment, refer to the foregoing embodiments. Details are not described in this embodiment again.

In one embodiment, the demultiplexer 2402 is further configured to: obtain indication information included in the at least one service switching indication bit block, where the indication information is used to indicate a quantity of bit blocks included in the bit block stream of the second service; and determine, according to the indication information, the quantity of bit blocks included in the bit block stream of the second service.

For specific description of the indication information bit block in this embodiment, refer to the foregoing embodiments. Details are not described in this embodiment again.

In one embodiment, the demultiplexer 2402 is further configured to: obtain a target identifier included in the at least one service switching indication bit block, where the target identifier is an identifier corresponding to the second service; and save the bit block stream of the second service to a target buffer, where the target buffer is a buffer allocated by the receiving device to the target identifier.

For specific description of the target identifier in this embodiment, refer to the foregoing embodiments. Details are not described in this embodiment again.

In one embodiment, the demultiplexer 2402 is further configured to: if it is determined that there is an idle bit block in the bit block stream of the first service and/or the bit block stream of the second service, delete the idle bit block.

For an idle bit block deletion process in this embodiment, refer to the foregoing embodiments. Details are not described in this embodiment again.

It may be clearly understood by persons skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in some embodiments. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, a network device, or the like) to perform all or some of the operations of the methods described in the embodiments of the present invention. The foregoing storage medium includes any medium that can store program code, for example, a USB flash drive, a removable hard disk, a read-only memory (ROM), a random access memory (RAM), a magnetic disk, or an optional disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A service multiplexing method, comprising:
   sending, by a sending device, a bit block stream of a first service to a receiving device;
   determining, by the sending device, whether to switch from the first service to a second service for service sending;
   if the sending device determines to switch from the first service to the second service for service sending, sending, by the sending device, at least one service switching indication bit block to the receiving device, wherein the at least one service switching indication bit block is used to indicate that the first service is switched to the second service for service sending; and
   sending, by the sending device, a bit block stream of the second service to the receiving device,
   wherein the at least one service switching indication bit block comprises an M1/M2 bit block, and wherein M1 represents a quantity of payload bits in each bit block, M2 represents a total quantity of bits in each bit block, M1 and M2 are positive integers, and M2>M1.

2. The method according to claim 1, wherein any bit block comprised in the bit block stream of the first service and any bit block comprised in the bit block stream of the second service are the M1/M2 bit blocks.

3. The method according to claim 2, wherein before the sending, by the sending device, the bit block stream of the first service to the receiving device, the method further comprises:
   obtaining, by the sending device, first service data of the first service; and
   encoding, by the sending device, the first service data to generate the bit block stream of the first service; and
   before the sending, by the sending device, a bit block stream of the second service to the receiving device, the method further comprises:
   obtaining, by the sending device, second service data of the second service; and
   encoding, by the sending device, the second service data to generate the bit block stream of the second service.

4. The method according to claim 2, wherein if the M1/M2 bit block is a 64B/66B bit block, there is at least one service switching indication bit block.

5. The method according to claim 2, wherein if the M1/M2 bit block is an 8B/10B bit block, there are a plurality of service switching indication bit blocks, and the plurality of service switching indication bit blocks comprise at least one special bit block and at least one data bit block.

6. The method according to claim 1, wherein the at least one service switching indication bit block further comprises indication information, and the indication information is used to indicate a quantity of bit blocks comprised in the bit block stream that is of the second service and that is sent to the receiving device.

7. The method according to claim 1, wherein before the sending, by the sending device, the at least one service switching indication bit block to the receiving device, the method further comprises:
   determining, by the sending device, a target identifier, wherein the target identifier is an identifier corresponding to the second service; and
   generating, by the sending device, the at least one service switching indication bit block, wherein the at least one service switching indication bit block comprises the target identifier, the target identifier is used to instruct the receiving device to save the bit block stream of the second service to a target buffer, and the target buffer is a buffer allocated by the receiving device to the target identifier.

8. A service demultiplexing method, comprising:
   determining, by a receiving device, whether at least one service switching indication bit block sent by a sending device is received, wherein the at least one service switching indication bit block is used to indicate that the sending device switches from a first service to a second service for service sending, and a bit block stream of the first service is a bit block stream that is received by the receiving device before the receiving device receives the at least one service switching indication bit block; and
   if the receiving device determines that the at least one service switching indication bit block is received, determining, by the receiving device, that a bit block stream that is received by the receiving device after the receiving device receives the at least one service switching indication bit block is a bit block stream of the second service,
   wherein the at least one service switching indication bit block comprises an M1/M2 bit block, and wherein M1 represents a quantity of payload bits in each bit block, M2 represents a total quantity of bits in each bit block, M1 and M2 are positive integers, and M2>M1.

9. The method according to claim 8, wherein any bit block comprised in the bit block stream of the first service and any bit block comprised in the bit block stream of the second service are the M1/M2 bit blocks.

10. The method according to claim 9, wherein before the receiving device determines that the at least one service switching indication bit block is received, the method further comprises:
   receiving, by the receiving device, the bit block stream that is of the first service and that is sent by the sending device; and
   decoding, by the receiving device, the bit block stream of the first service, to obtain first service data of the first service; and
   after the receiving device determines that the at least one service switching indication bit block is received, the method further comprises:
   receiving, by the receiving device, the bit block stream that is of the second service and that is sent by the sending device; and
   decoding, by the receiving device, the bit block stream of the second service, to obtain second service data of the second service.

11. The method according to claim 9, wherein if the M1/M2 bit block is a 64B/66B bit block, there is at least one service switching indication bit block.

12. The method according to claim 9, wherein if the M1/M2 bit block is an 8B/10B bit block, there are a plurality of service switching indication bit blocks, and the plurality of service switching indication bit blocks comprise at least one special bit block and at least one data bit block.

13. The method according to claim 10, wherein after the receiving device determines that the at least one service switching indication bit block is received, the method further comprises:
   obtaining, by the receiving device, indication information comprised in the at least one service switching indication bit block, wherein the indication information is used to indicate a quantity of bit blocks comprised in the bit block stream of the second service; and
   determining, by the receiving device according to the indication information, the quantity of bit blocks comprised in the bit block stream of the second service.

14. The method according to claim 8, wherein after the receiving device determines that the at least one service switching indication bit block is received, the method further comprises:
   obtaining, by the receiving device, a target identifier comprised in the at least one service switching indication bit block, wherein the target identifier is an identifier corresponding to the second service; and
   saving, by the receiving device, the bit block stream of the second service to a target buffer, wherein the target buffer is a buffer allocated by the receiving device to the target identifier.

15. A sending device, comprising a transmitter and a multiplexer connected to the transmitter, wherein:
   the transmitter is configured to send a bit block stream of a first service to a receiving device;
   the multiplexer is configured to determine whether to switch from the first service to a second service for service sending; and
   the transmitter is further configured to: if the multiplexer determines to switch from the first service to the second service for service sending, send at least one service switching indication bit block to the receiving device, wherein the at least one service switching indication bit block is used to indicate that the first service is switched to the second service for service sending; and the transmitter is further configured to send a bit block stream of the second service to the receiving device,
   wherein the at least one service switching indication bit block comprises an M1/M2 bit block, and wherein M1 represents a quantity of payload bits in each bit block, M2 represents a total quantity of bits in each bit block, M1 and M2 are positive integers, and M2>M1.

16. The sending device according to claim 15, wherein any bit block comprised in the bit block stream of the first service and any bit block comprised in the bit block stream of the second service are the M1/M2 bit blocks.

17. The sending device according to claim 16, wherein the transmitter is further configured to: obtain first service data of the first service, encode the first service data to generate the bit block stream of the first service, obtain second service data of the second service, and encode the second service data to generate the bit block stream of the second service.

18. The sending device according to claim 16, wherein if the M1/M2 bit block is an 8B/10B bit block, there are a plurality of service switching indication bit blocks, and the plurality of service switching indication bit blocks comprise at least one special bit block and at least one data bit block.

19. The sending device according to claim 15, wherein the at least one service switching indication bit block further comprises indication information, and the indication information is used to indicate a quantity of bit blocks comprised in the bit block stream that is of the second service and that is sent to the receiving device.

20. The sending device according to claim 15, wherein the multiplexer is further configured to: determine a target identifier, wherein the target identifier is an identifier corresponding to the second service; and generate the at least one service switching indication bit block, wherein the at least one service switching indication bit block comprises the target identifier, the target identifier is used to instruct the receiving device to save the bit block stream of the second service to a target buffer, and the target buffer is a buffer allocated by the receiving device to the target identifier.

* * * * *